United States Patent [19]
Yamada

[11] Patent Number: 5,649,007
[45] Date of Patent: Jul. 15, 1997

[54] TELEPHONE SET OF DISTINCTIVE RINGING TYPE CAPABLE OF GENERATING DIFFERENT CALLING SOUNDS AFTER THE TELEPHONE SET IS CONNECTED TO REMOTE CALLING PARTY

[75] Inventor: Makoto Yamada, Gifu, Japan

[73] Assignee: Brother Kogyo Kabushiki Kaisha, Nagoya, Japan

[21] Appl. No.: 350,151

[22] Filed: Nov. 29, 1994

[30] Foreign Application Priority Data

Dec. 7, 1993 [JP] Japan ................. 5-306904

[51] Int. Cl.$^6$ ............................................ H04M 1/00
[52] U.S. Cl. .................... 379/373; 379/372; 379/375
[58] Field of Search ................... 379/67, 70, 82, 379/88, 89, 93, 96, 97, 100, 102, 104, 105, 142, 156, 164, 167, 170, 172, 173, 177, 179, 181, 182, 183, 187, 251, 252, 350, 352, 354, 372, 373, 374, 375, 376, 418

[56] References Cited

U.S. PATENT DOCUMENTS

| | | | |
|---|---|---|---|
| 3,689,705 | 9/1972 | Pinede et al. | 379/180 |
| 3,928,732 | 12/1975 | Simon et al. | 379/164 |
| 3,946,146 | 3/1976 | Brown et al. | 379/164 |
| 4,192,007 | 3/1980 | Becker | 379/100 X |
| 4,282,410 | 8/1981 | Gauthier et al. | 379/418 |
| 4,477,697 | 10/1984 | Judd et al. | 379/375 |
| 4,495,075 | 1/1985 | Angiolillo-Bant et al. | 379/142 |
| 4,578,540 | 3/1986 | Borg et al. | 379/387 X |
| 4,646,347 | 2/1987 | Liu | 379/375 |
| 4,677,660 | 6/1987 | Yoshida | 379/164 |
| 4,720,848 | 1/1988 | Akiyama | 379/88 |
| 4,782,518 | 11/1988 | Mattley et al. | 379/201 |
| 4,802,202 | 1/1989 | Takahashi et al. | 379/67 |
| 4,850,012 | 7/1989 | Mehta et al. | 379/157 |
| 4,998,273 | 3/1991 | Nichols | 379/102 |
| 5,040,209 | 8/1991 | Greenburg et al. | 379/373 |
| 5,073,922 | 12/1991 | Okada | 379/164 |

(List continued on next page.)

FOREIGN PATENT DOCUMENTS

| | | | |
|---|---|---|---|
| 55-149798 | 5/1982 | Japan | 379/374 |
| 57-184357 | 11/1982 | Japan | 379/374 |
| 59-049050 | 3/1984 | Japan | 379/373 |
| 60-196057 | 10/1985 | Japan | 379/350 |
| 61-287361 | 12/1986 | Japan | 379/374 |
| 63-007060 | 1/1988 | Japan | 379/375 |
| 63-104550 | 5/1988 | Japan | 379/375 |
| 63-157551 | 6/1988 | Japan | 379/381 |
| 63-256038 | 10/1988 | Japan | 379/373 |
| 63-258143 | 10/1988 | Japan . | |
| 63-268338 | 11/1988 | Japan | 379/374 |
| 63-278455 | 11/1988 | Japan | 379/373 |
| 1-279658 | 11/1989 | Japan | 379/374 |
| 2-027821 | 1/1990 | Japan | 379/374 |
| 2-079547 | 3/1990 | Japan | 379/374 |
| 2-183659 | 7/1990 | Japan | 379/372 |
| 2-218249 | 8/1990 | Japan | 379/375 |
| 2-303251 | 12/1990 | Japan | 379/375 |
| A-4-48855 | 2/1992 | Japan . | |

(List continued on next page.)

OTHER PUBLICATIONS

"Dialing for Dollars", The Washington Post, Washington Business, Jan. 15, 1990, p. 3.

"Speech–Synthesis Telephone Call Annunciator", IBM Technical Disclosure Bulletin, vol. 31, No. 8, Jan. 1989 pp. 261–264.

*Primary Examiner*—Krista M. Zele
*Assistant Examiner*—Scott L. Weaver
*Attorney, Agent, or Firm*—Oliff & Berridge

[57] ABSTRACT

A telephone set of distinctive ringing type of a called party capable of generating calling sounds depending upon respective call signals of different patterns received from a remote calling party, including a pattern detector for detecting the pattern of each call signal before the telephone set is connected to the calling party, and a sound generator which operates after the telephone set is connected to the calling party, to generate calling sounds having respective different patterns, depending upon the patterns of the received call signals as detected by the sound detector.

10 Claims, 19 Drawing Sheets

U.S. PATENT DOCUMENTS

| | | | |
|---|---|---|---|
| 5,086,458 | 2/1992 | Bowen | 379/180 |
| 5,119,418 | 6/1992 | Dupillier | 379/373 |
| 5,142,569 | 8/1992 | Peters et al. | 379/201 |
| 5,200,992 | 4/1993 | Yoshino | 379/93 |
| 5,200,994 | 4/1993 | Sasano et al. | 379/142 |
| 5,253,289 | 10/1993 | Tanoka | 379/373 |
| 5,299,256 | 3/1994 | Hu | 379/96 |
| 5,307,059 | 4/1994 | Connery et al. | 379/71 X |
| 5,309,434 | 5/1994 | Naekawa | 379/96 X |
| 5,323,451 | 6/1994 | Yatsunomi | 379/100 |
| 5,333,190 | 7/1994 | Eyster | 379/375 |
| 5,357,562 | 10/1994 | Metser et al. | 379/67 |
| 5,361,296 | 11/1994 | Reyes et al. | 379/96 |
| 5,371,781 | 12/1994 | Ardon | 379/59 |
| 5,425,089 | 6/1995 | Ohon et al. | 379/183 |
| 5,428,673 | 6/1995 | Nakagawa et al. | 379/100 |
| 5,432,844 | 7/1995 | Core et al. | 379/67 |
| 5,442,463 | 8/1995 | Onuisui | 379/97 X |
| 5,446,784 | 8/1995 | MacTeggert | 379/102 |
| 5,447,692 | 9/1995 | Yamazaki et al. | 379/253 |
| 5,452,346 | 9/1995 | Miyamoto | 379/142 |
| 5,452,354 | 9/1995 | Kryonlonti et al. | 379/375 |
| 5,471,522 | 11/1995 | Sells et al. | 379/97 |
| 5,481,599 | 1/1996 | MacAllister et al. | 379/374 X |
| 5,485,508 | 1/1996 | Ho | 379/97 |
| 5,490,210 | 2/1996 | Sasso | 379/100 |
| 5,544,235 | 8/1996 | Ardon | 379/373 X |

FOREIGN PATENT DOCUMENTS

| | | | |
|---|---|---|---|
| 5-110635 | 4/1993 | Japan | 379/350 |
| 5-153227 | 6/1993 | Japan | 379/214 |
| 2193419 | 2/1988 | United Kingdom | 379/373 |
| 9112685 | 8/1991 | WIPO | 379/374 |

FIG.2

EEPROM 32

| REGISTRATION NO. | CALL SIGNAL PATTERN MEMORY AREAS | RING PATTERN MEMORY AREAS |
|---|---|---|
| 0 | FACSIMILE RECEPTION PATTERN | |
| 1 | TELEPHONE RECEPTION PATTERN FOR MR. A | PATTERN FOR MR. A |
| 2 | TELEPHONE RECEPTION PATTERN FOR MR. B | PATTERN FOR MR. B |
| 3 | | |
| 4 | | PATTERN FOR MR. C |
| 5 | | PATTERN FOR MR. D |
| 6 | | PATTERN FOR MR. E |
| 7 | | |
| 8 | | |
| 9 | | CALL RESERVATION PATTERN |

32a       32b

| MAIN ITEMS | SUB-ITEMS |
| --- | --- |
| 1. TEMP SETTING | 1. TIMER<br>2. POLLING<br>. |
| 2. CANCEL JOB | N / A |
| 3. PRINT REPORT | 1. ACT REPORT<br>2. ALL DIAL<br>. |
| 6. TEL OPTION | 1. TONE / PULSE<br>2. RING DELAY<br>.<br>7. DISTINCTIVE<br>8. RING PATTERN<br>9. MESSAGE |
| 7. SETUP SYSTEM | 1. DATE / TIME |

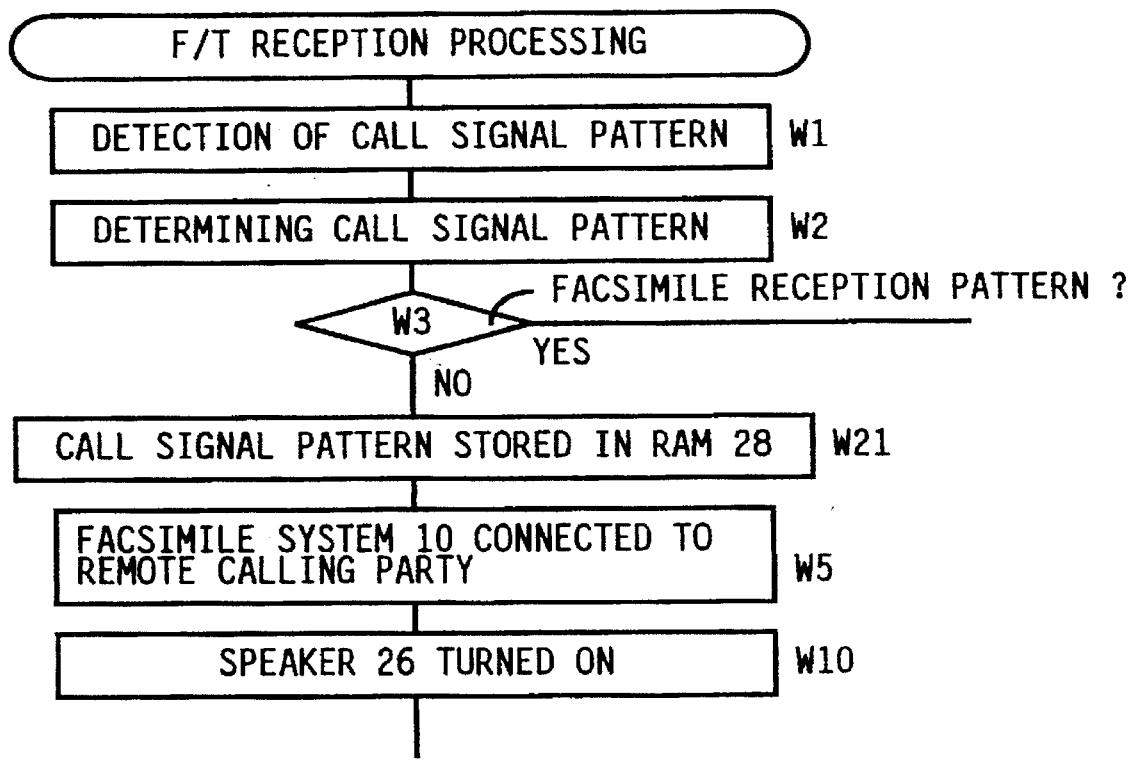

F/T RECEPTION PROCESSING
→ DETECTION OF CALL SIGNAL PATTERN — W1
→ DETERMINING CALL SIGNAL PATTERN — W2
→ W3: FACSIMILE RECEPTION PATTERN? YES / NO
→ (NO) CALL SIGNAL PATTERN STORED IN RAM 28 — W21
→ FACSIMILE SYSTEM 10 CONNECTED TO REMOTE CALLING PARTY — W5
→ SPEAKER 26 TURNED ON — W10

FIG. 18

AUDIO DRAM

| REGISTRATION NUMBER | CALL MESSAGE MEMORY AREAS |
|---|---|
| 1 | MESSAGES FOR MESSRS. K, L AND M |
| 2 | MESSAGES FOR MESSRS. O AND P |
| 3 | |

FIG. 19

EEPROM 32

| REGISTRATION NO. | CALL SIGNAL PATTERN MEMORY AREAS | RING PATTERN MEMORY AREAS |
|---|---|---|
| 0 | FACSIMILE RECEPTION PATTERN | |
| 1 | TELEPHONE RECEPTION PATTERN FOR USER GROUP A | PATTERN FOR USER GROUP A |
| 2 | TELEPHONE RECEPTION PATTERN FOR USER GROUP B | PATTERN FOR USER GROUP B |
| 3 | | |
| 4 | | PATTERN FOR MR. K |
| 5 | | PATTERN FOR MR. L |
| 6 | | PATTERN FOR MR. M |
| 7 | | PATTERN FOR MR. O |
| 8 | | PATTERN FOR MR. P |
| 9 | | PHONE CALL RESERVATION |

32a  32b 5,649,007

TELEPHONE SET OF DISTINCTIVE RINGING TYPE CAPABLE OF GENERATING DIFFERENT CALLING SOUNDS AFTER THE TELEPHONE SET IS CONNECTED TO REMOTE CALLING PARTY

BACKGROUND OF THE INVENTION

1. Field of the Invention

The present invention relates in general to a telephone set (a combination of a telephone transmitter and a telephone receiver) which has an automatic selective facsimile/telephone reception mode (hereinafter referred to as "F/T reception mode") and is capable of generating a ringing sound after the telephone set of a called party is connected to a remote telephone set of a calling party. More particularly, the present invention is concerned with a telephone set of distinctive ringing type which uses two or more telephone numbers and which is adapted to receive call signals having different patterns which call the respective telephone numbers and generate ringing sounds of different patterns depending upon the patterns of the received call signals even after the telephone set is connected through a telephone line to the remote calling party.

2. Discussion of the Related Art

There is known a telephone set adapted to utilize a so-called "distinctive ringing service (D/R service)" available from a telephone exchange company. This telephone set of distinctive ringing type uses two or more telephone numbers on one telephone line. The distinctive ringing service provides the telephone set with telephone call signals which have different patterns as illustrated at (a) through (d) in FIG. 20, when the respective telephone numbers are called by a remote telephone transmitter of the calling party, so that the ringing device of the facsimile system of the receiving or called party generates different types of ringing sound depending upon the telephone numbers being called.

Where such a telephone set of distinctive ringing type is incorporated in a facsimile system as a telephone portion thereof, one of the telephone numbers is used exclusively for facsimile communication with a facsimile portion of a remote facsimile system, while the other telephone number or numbers is/are exclusively used for telephone communication with a telephone portion of the remote facsimile system. The telephone number called by the remote facsimile system of the calling party can be recognized by the specific type of the ringing sound generated according to the specific pattern of the appropriate call signal received at the called party. In this case, the pattern of the facsimile reception call signal assigned to call the telephone number exclusively used for the facsimile communication is registered in memory means at the called party. When the telephone set at the called party receives a call signal from a telephone exchange company, the pattern of the received call signal is compared with the registered pattern of the facsimile reception call signal, and a facsimile signal received with the call signal is automatically processed for recording of an image represented by the facsimile signal, if the pattern of the received call signal is the same as the registered facsimile reception call signal pattern. An example of such facsimile system of distinctive ringing type is disclosed in JP-A-4-48855.

The distinctive ringing service is also useful and convenient where two or more users use one or more telephone sets connected to one telephone line. In the case where a facsimile system incorporating one telephone set using three telephone numbers is used by Messrs. A and B, for example, the telephone number [1111] is used as the facsimile reception telephone number, and the telephone numbers [2222] and [3333] are used for telephone communication by Mr. A and Mr. B, respectively. Mr. A informs the potential calling parties that Mr. A uses the telephone number [1111] exclusively for facsimile reception and the telephone number [2222] exclusively for telephone communication, while Mr. B informs the potential calling parties that Mr. B uses the telephone number [1111] exclusively for facsimile reception and the telephone number [3333] exclusively for telephone communication. A facsimile signal addressed to Mr. A or Mr. B by the corresponding call signal is automatically received (converted into the corresponding image). When a call signal calling the telephone numbers [2222] or [3333] is received, the user can find out whether the telephone call is addressed to Mr. A or Mr. B, by listening to the ringing sound generated according to the specific pattern of the call signal. That is, the different patterns of the ringing sounds enable the users to determine the telephone number being called.

Some telephone sets of distinctive ringing type are adapted to generate ringing sounds after the telephone sets are connected through the telephone lines to the remote telephone sets upon reception of respective call signals. In a facsimile system incorporating such a telephone set and having a F/T reception mode, a ringing sound is first generated according to a received call signal after the facsimile system of the called party is connected to the remote facsimile system of the calling party. If a facsimile signal transmission signal CNG (calling tone signal) is received following the call signal, a ringing device generating the calling sound is turned off, and a facsimile signal if received following the signal CNG is automatically processed for image recording. The signal CNG indicates that the facsimile signal will be transmitted from the remote facsimile transmitter. Even if the signal CNG is not received, the ringing device is turned off and the facsimile signal if received is automatically processed if the telephone hand set at the called party is not picked up for more than a predetermined time after the call signal is received from the remote calling party. If the telephone hand set is picked up within the predetermined time, telephone communication with the remote telephone set is made possible.

However, the call signal from the telephone exchange company is no longer received after the facsimile system of the called party is connected through the telephone line to the remote facsimile system of the calling party. Hence, the generation of the ringing sound after the call signal from the telephone exchange company is cut off should be effected according to a given ON-OFF pattern preset in the telephone set at the called party. This means that the telephone set cannot utilize the distinctive ringing service (D/R service) that permits the generation of ringing sounds of different patterns depending upon the telephone numbers being called by respective call signals of different patterns.

SUMMARY OF THE INVENTION

It is therefore an object of the present invention to provide a telephone set of distinctive ringing type which permits the generation of calling sounds of different patterns depending upon respective different patterns of the received call signals even after the telephone set of the called party is connected through a telephone line to a remote calling party.

The above object may be achieved according to one aspect of the present invention, which provides a telephone set of distinctive ringing type of a called party capable of generating calling sounds indicating the reception of respective call signals having respective different patterns calling respective telephone numbers, after the telephone set is connected through a telephone line to a remote calling party, the telephone set comprising: (a) pattern detecting means for detecting the pattern of each of the call signals received from the calling party, before the telephone set is connected to the remote calling party; and (b) first sound generating means, operable after the telephone set is connected to the remote calling party, for generating calling sounds having respective different patterns, depending upon the patterns of the call signals as detected by the pattern detecting means.

In the telephone set of the present invention constructed as described above, the pattern of each call signal received from the remote calling party is detected or determined by the pattern detecting means before the telephone set is connected to the calling party. Then, after the telephone set is connected to the calling party, the first sound generating means operates to generate the calling sound whose pattern corresponds to the pattern of the received call signal as detected by the pattern detecting means. Thus, the present telephone set enables the user or users to know the telephone number being called by the received call signal, by listening to the calling sound which is generated by the first sound generating means after the telephone set is connected to the calling party, namely, even after the call signal is cut off. Thus, the present telephone set is capable of fully utilizing the distinctive ringing service available from a telephone exchange company, that is, generating calling sounds having different patterns depending upon the different patterns of the received call signals even after the telephone set is connected to the remote calling party.

In one preferred form of the invention, the telephone set further comprises: a pattern data memory for storing pattern data representative of the different patterns of the calling sounds; operator-controlled means for establishing a registering mode in which the pattern data are stored in the pattern data memory; pattern registering means, operable in the registering mode, for storing the different patterns of the calling sounds in the pattern data memory, as the pattern data; and pattern selecting means, operable when the telephone set is not placed in the registering mode, for selecting one of the different patterns of the calling sounds which corresponds to the pattern of each received signal as detected by the pattern detecting means. In this instance, the first sound generating means generates the calling sound according to the pattern selected by the pattern selecting means.

The first sound generating means may be ringing means for generating ringing sounds having respective different patterns, or means for generating different call messages which indicate the reception of the respective call signals. That is, the calling sounds may take the form of either ringing sounds of different patterns or vocal message sounds of different patterns or types.

In another preferred form of the invention, the telephone set further comprises a first pattern data memory for storing first pattern data sets representative of respective patterns of calling sounds which correspond to respective pattern designating signals received from the remote calling party, and the first sound generating means retrieves from the first pattern data memory one of the first pattern data sets which represents one of the patterns of calling sounds which corresponds to the pattern designating signal which has been received from the remote calling party after the telephone set is connected to the remote calling party. In this case, the first sound generating means generates the calling sound according to the pattern represented by the first pattern data set retrieved from the first pattern data memory, in place of the pattern which corresponds to the pattern of the received call signal as detected by the pattern detecting means.

In the above preferred form of the invention, the first pattern data memory stores the patterns of calling sounds corresponding to the respective pattern designating signals received from the remote calling party, and the first sound generating means retrieves from the first pattern data memory one of the calling sound patterns which corresponds to the pattern designating signal which has been received from the calling party after the telephone set is connected to the remote calling party, so that the first sound generating means generates the calling sound according to the pattern represented by the retrieved pattern, rather than the pattern which corresponds to the pattern of the received call signal as detected by the pattern detecting means described above.

The pattern designating signals may be generated by operation of respective operator-controlled keys at the remote calling party, which keys correspond to the persons at the called party with whom the calling party likes to speak by telephone.

According to one advantageous arrangement of the above preferred form of the invention, the telephone set further comprises: a message data memory for storing message data representative of at least one prompting message which prompts the remote calling party to generate one of the pattern designating signals; and message generating means, operable after the telephone set is connected to the remote calling party, for transmitting a selected prompting message to the remote calling party. In this arrangement, the first sound generating means comprises pattern selecting means for selecting one of the first pattern data sets stored in the first pattern data memory, depending upon the pattern designating signal which is generated from the remote calling party in response to the selected one prompting message.

However, the prompting message need not be transmitted to the calling party, if the calling party knows the relationship between the patterns of the calling sounds and the pattern designating signals, more specifically, between the calling sound patterns and the keys operated to generate the pattern designating signals.

The preferred form of the invention adapted to receive the pattern designating signals to select the patterns of the calling sounds is convenient where the number of the users of the telephone set at the called party is larger than the number of the telephone numbers used for the telephone set, for example, where two or more users use the same telephone number. These users may easily recognize the recipient of a telephone call from the calling party, even though they use the same telephone number.

According to a further preferred form of the invention, the telephone set further comprises: second pattern data memory for storing a second pattern data set representative of a pattern of a special calling sound which is generated upon reception of a phone call reservation signal received from the remote calling party; and second sound generating means, responsive to the phone call reservation signal received after the telephone set is connected to the remote calling party, for retrieving the second pattern data set from the second pattern data memory, and generating the special calling sound according to the retrieved second pattern data set.

The phone call reservation signal may be generated by operation of an operator-controlled key which is provided at the remote calling party. The operator-controlled key is operated when the remote calling party wants to speak with the called party.

In the above preferred form of the invention, the special calling sound generating by the second sound generating means informs the user or users of the telephone set that the calling party wants to speak with the called party.

BRIEF DESCRIPTION OF THE DRAWINGS

The above and other objects, features and advantages of this invention will be better understood by reading the following detailed description of presently preferred embodiments of the invention, when considered in connection with the accompanying drawings, in which:

FIG. 2 is a view indicating memory areas of an EEPROM used in the facsimile system of FIG. 1;

FIG. 5 is a view indicating some of functions that can be set by FUNCTION and SELECTOR keys on the control and display panel of FIG. 4;

FIG. 17 is a flow chart illustrating a sub-routine corresponding to that of FIGS. 14 and 15, in another embodiment of the present invention;

FIG. 18 is a view indicating contents of the memory areas of the audio DRAM in a further embodiment of the invention;

FIG. 19 is a view indicating contents of the memory areas of the EEPROM in the embodiment of FIG. 18.

DETAILED DESCRIPTION OF THE PREFERRED EMBODIMENT

Figure 1:
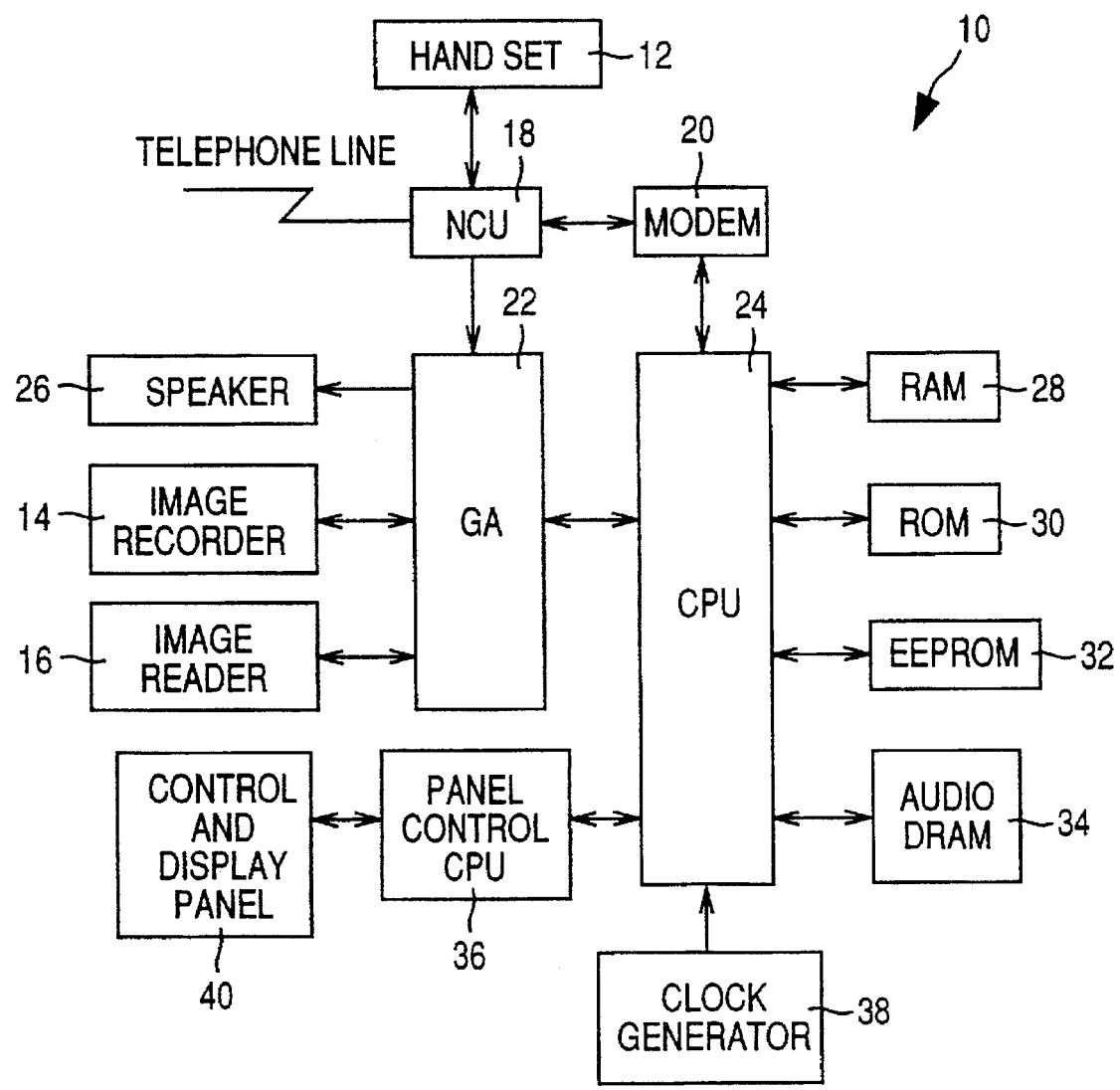
FIG. 1 is a block diagram showing a facsimile system of distinctive ringing type constructed according to one embodiment of the present invention.

Referring first to the block diagram of FIG. 1, reference numeral 10 generally denotes a facsimile system constructed according to one embodiment of this invention. The facsimile system 10 is capable of performing selective telephone communication and facsimile communication with a remote facsimile system through a telephone line, more precisely, capable of transmitting and receiving a telephone or sound signal and a facsimile or image signal to and from the remote facsimile system. The facsimile system 10 incorporates: a telephone hand set 12 for the telephone communication; an image recorder 14 including a printer for recording an image on a recording medium on the basis of a facsimile signal received from the remote facsimile transmitter; and an image reader 16 including a CCD (charge-coupled device) image sensor or scanner. A telephone line connected to a telephone exchange company is connected to a network control unit (NCU) 18. This NCU 18 is connected to the hand set 12, a MODEM for modulating and demodulating an facsimile signal (image or picture signal), and a gate array (GA) 22. The GA 22 incorporates various logic circuits for performing respective functions, including: activating a speaker 26 according to a drive signal received from a central processing unit (CPU) 24; controlling the image reader 16; and transferring image data from the image reader 16 to the CPU 24. The GA 22 receives from the telephone line a call signal CI (calling indicator) and various other signals through the NCU 18, so that the speaker 26 is operated to generate a ringing sound according to ON and OFF states of the received call signal CI as indicated in FIG. 17 by way of example. The GA 22 is also adapted to detect the frequency of the received signals.

To the CPU 24, there are connected through respective data bus lines the MODEM 20 and GA 22 described above, a random-access memory (RAM) 28, a read-only memory (ROM) 30, an electrically erasable programmable read-only memory (EEPROM) 32, an audio DRAM 34, a panel control CPU 36 and a clock generator 38. The CPU 24 operates according to control programs stored in the ROM 30 while utilizing a temporary data storage function of the RAM 28. The CPU 24 receives a clock signal having a predetermined frequency from the clock generator 38. The EEPROM 32 is capable of storing data such that the stored data are electrically erasable as needed. As indicated in FIG. 2, the EEPROM 32 has a call pattern memory section 32a and and a ring pattern memory section 32b. Each of these memory sections 32a, 32b has ten memory areas corresponding to registration numbers [0] through [9]. The memory area of the call pattern memory section 32a which corresponds to the registration number [0] is used for storing the pattern of the facsimile reception call signal assigned to call the facsimile reception telephone number. The memory areas of the call pattern memory section 32a corresponding to the registration numbers [1], [2] and [3] are used for storing the patterns of the other call signals which are assigned to call the telephone numbers for telephone communication, while the corresponding memory areas of the ring pattern memory section 32b are used for storing respective patterns of ringing sounds that are generated when the corresponding call signals of different patterns are received (when the corresponding telephone numbers are called by the respective call signals). Further, the memory areas of the ring pattern memory section 32b which correspond to the registration numbers [4] through [8] are used to store first pattern data sets representative of the patterns of ringing sounds that are generated when corresponding pattern designating signals are received from the remote calling party. These pattern designating signals (in the form of a signal DTMF described below) are generated by pressing of numeral keys "4" through "8" of FUNCTION/NUMERAL keys 42 (which will be described) provided at the remote calling party as keys for entering telephone numbers. The last memory area of the ring pattern memory section 32b corresponding to the registration number [9] is used to store a second pattern data set representative of the pattern of a special ringing sound that is generated when a phone call reservation signal generated by operation of an appropriate key at the calling party is received from the calling party.

The ringing sounds whose patterns are stored in the memory areas of the ring pattern memory section 32b which correspond to the registration numbers [1] through [3] may be generated when the numeral keys "1" through "3" of the FUNCTION/NUMERAL keys 42 at the called party are pressed. The memory areas of the call pattern memory section 32a which correspond to the registration numbers [4] through [8] may also be used for storing the patterns of other call signals for the other telephone numbers.

As indicated above, the distinctive ringing service available from a telephone exchange company permits two or more users to use different telephone numbers on a single facsimile system or telephone set or two or more facsimile systems or telephone sets connected to a single telephone line. Since the different ringing sounds are generated according to the different patterns of the respective call signals which call the respective telephone numbers, the users can know who receive phone calls or facsimile messages. To this end, the patterns of the ringing sounds corresponding to the telephone numbers are stored in the ring pattern memory section 32a, in relation to the patterns of the corresponding call signals stored in the call pattern memory section 32a.

Suppose three telephone numbers [1111], [2222] and [3333] are used for one facsimile system used by Messrs. A and B, the telephone number [1111] is used exclusively for facsimile reception, while the telephone numbers [2222] and [3333] are used for telephone communication exclusively by Mr. A and Mr. B, respectively, for example. In this case, the pattern of the call signal calling the facsimile reception telephone number [1111] is registered as the facsimile reception pattern in the memory area corresponding to the registration number [0] of the call pattern memory section 32a, as indicated in FIG. 2. In the memory areas corresponding to the registration number [1] of the call pattern memory section 32a and the ring pattern memory section 32b, there are respectively registered the pattern of the call signal calling the telephone number [2222] used by Mr. A and the pattern of the corresponding ringing sound. In the memory areas corresponding to the registration number [2] of the memory sections 32a, 32b, there are respectively registered the pattern of the call signal calling the telephone number [3333] used by Mr. B and the pattern of the corresponding ringing sound. If Messrs. C, D and E as well as Messrs. A and B may use the facsimile system in question, the patterns of the ringing sounds corresponding to the telephone numbers used by Messrs. C, D and E may be registered in the memory areas corresponding to the registration numbers [4], [5] and [6] of the ring pattern memory section 32b. If no ring pattern data are stored in the ring pattern memory section 32b of the EEPROM 32, a ringing sound of a predetermined pattern is generated upon reception of each call signal.

Figure 3:
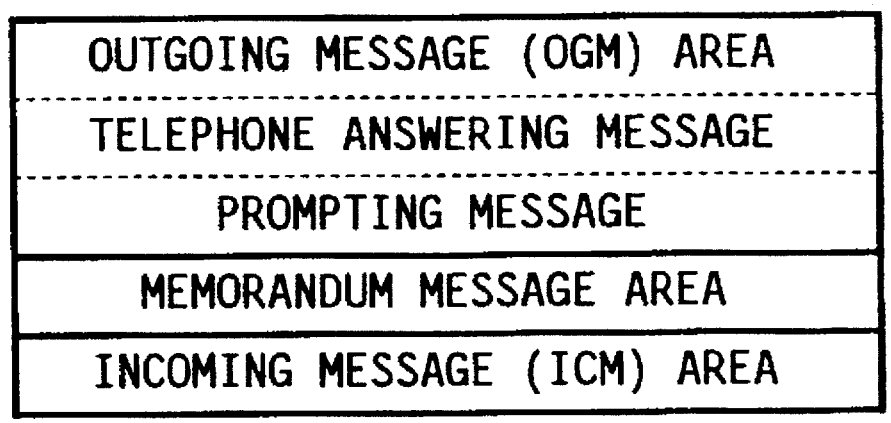
FIG. 3 is a view indicating memory areas of an audio DRAM used in the facsimile system of FIG. 1.

The audio DRAM 34 is used in a telephone answering mode (hereinafter referred to as "TAD mode") in step R11 of FIG. 13, and in a facsimile/telephone reception mode (hereinafter referred to as "F/T mode") in step W6 of FIG. 14. As indicated in FIG. 3, the audio DRAM 34 has three memory areas, namely: an outgoing message area for storing outgoing messages (OGM) to be transmitted to a remote telephone receiver; a memorandum message area for storing memorandum messages; and an incoming message area for storing an incoming message (ICM) received from a remote telephone transmitter. The outgoing messages include a telephone answering message, and a prompting message to be transmitted to the remote telephone receiver. The prompting message asks the remote calling party to press one of numeral keys "1" through "6" of the FUNCTION/NUMERAL keys 42, which corresponds to the person with whom the calling party wishes to speak. For example, the prompting message may be a message "Please press the numeral key "1" to speak with Mr. A, numeral key "2" to speak with Mr. B, or numeral key "4" to speak with Mr. C.".

Figure 4:
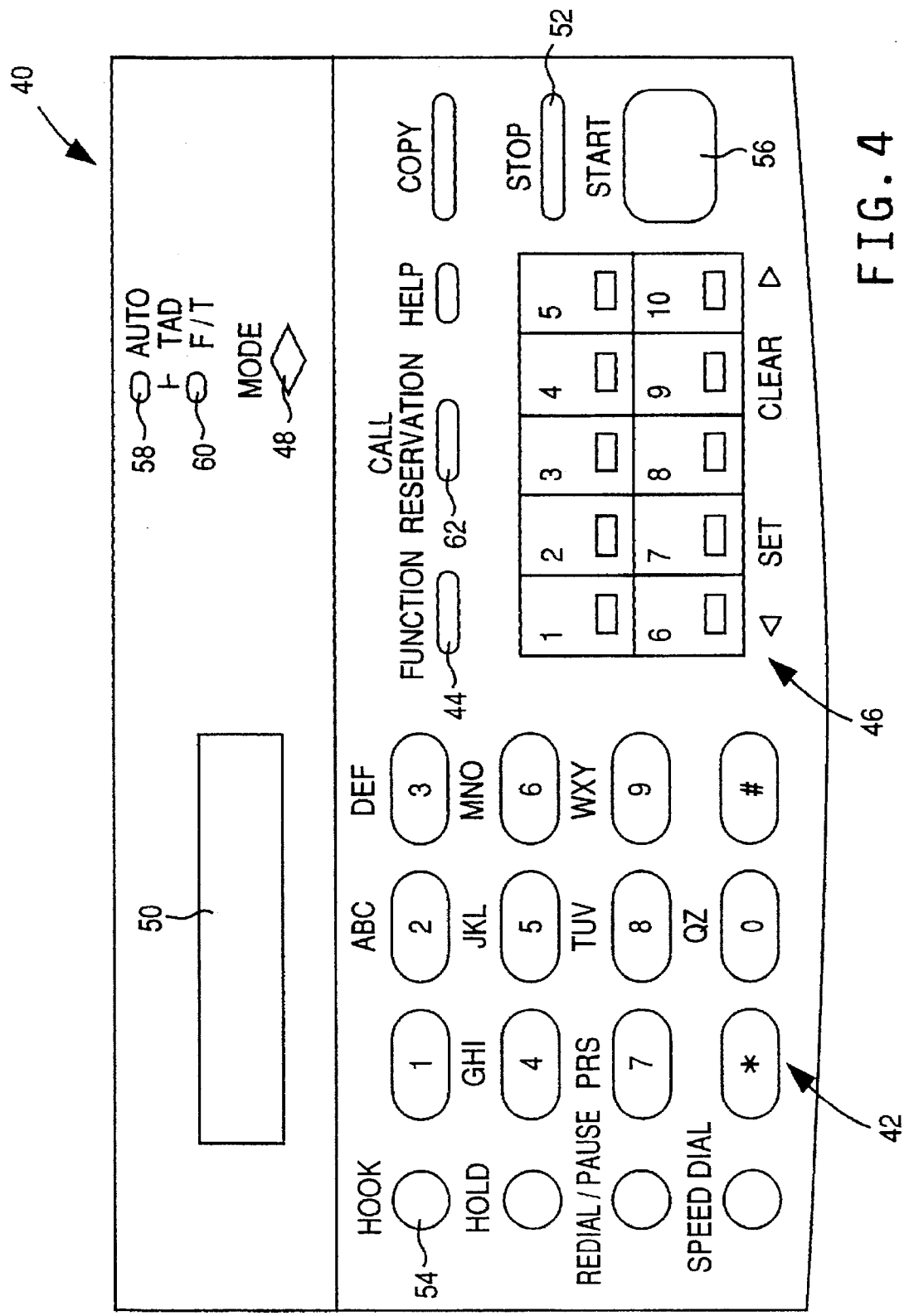
FIG. 4 is a view illustrating an operator's control and display panel provided in the facsimile system of FIG. 1.

The panel control CPU 36 is adapted to control an operator's control and display panel 40 according to signals from the CPU 24, and transmit output signals of the panel 40 to the CPU 24. An example of the panel 40 is illustrated in FIG. 4. In this example, the panel 40 includes: FUNCTION/NUMERAL keys 42 generally known as "TEN keys"; a FUNCTION key 44; SELECTOR keys 46; a MODE key 48; and a display 50 such as a liquid crystal display. The FUNCTION/NUMERAL keys 42 are used to enter data such as telephone numbers, and include ten numeral keys representative of numerals "0" through "9". The FUNCTION key 44 is used together with the SELECTOR keys 46, to achieve or change various functional settings as indicated in FIG. 5. As described below in detail with respect to the setting or selection of D/R modes, a functional setting is accomplished by first pressing the FUNCTION key 44 and then pressing appropriate ones of the SELECTOR keys 46 in a predetermined order.

In the present embodiment, the facsimile system 10 have a D/R SET mode, a RING PATTERN SET mode, and a MESSAGE SET mode. In the D/R SET mode, the patterns of the call signals may be stored in the call pattern memory section 32a of the EEPROM 32. In the RING PATTERN SET mode, the patterns of the ringing sounds corresponding to the telephone numbers (call signal patterns) may be stored in the ring pattern memory section 32b of the EEPROM 32. In the MESSAGE SET mode, the prompting message may be stored in the audio DRAM 34.

To select the D/R SET mode, the FUNCTION key 44 is first pressed, and then the keys "6" and "7" of the SELECTOR keys 46 are pressed in this order, to select "6. TEL OPTION" of the MAIN ITEMS and "7. DISTINCTIVE" of the SUB-ITEMS in a function table illustrated in FIG. 5. With the keys "6" and "7" pressed, the display 50 provides an indication "7. DISTINCTIVE". In this condition, the key "7" labelled "SET" of the SELECTOR keys 46 is pressed to establish the D/R SET mode, and the display 50 provides an indication "D/R SET MODE". To select the RING PATTERN SET mode, the keys "6" and "8" of the SELECTOR keys 46 are pressed following the FUNCTION key 44. In this case, the display 50 provides an indication "8. RING PATTERN". In this condition, the key "7" labelled "SET" is pressed to establish the RING PATTERN SET mode, and the display 50 provides an indication "RING PATTERN SET MODE". To select the the MESSAGE SET mode, the keys "6" and "9" of the SELECTOR keys 46 are pressed following the FUNCTION key 44. In this case, the display 50 provides an indication "9. MESSAGE". In this condition, the key "7" labelled "SET" is pressed to establish the MESSAGE SET mode, and the display 50 provides an indication "MESSAGE SET MODE".

The MODE key 48 is used to select one of reception modes of the facsimile system 10, namely, automatic facsimile reception mode (hereinafter referred to as "AUTO mode"), selective facsimile/telephone reception mode (hereinafter referred to as "F/T mode"), telephone answering mode (hereinafter referred to as "TAD mode") and manual reception mode (hereinafter referred to as "MANUAL mode"). These reception modes will be described later by reference to the flow charts of FIGS. 11–13. The currently selected reception mode is changed each time the MODE key 48 is pressed. When the AUTO mode is selected, a light emitting diode 58 is on. When the F/T mode is selected, a light emitting diode 60 is on. When the TAD mode is selected, the diodes 58, 60 are both on. When the MANUAL mode is selected, the diodes 58, 60 are both off. The RAM 28 also stores data indicative of the currently selected reception mode of the system 10.

Referring next to the flow charts of FIGS. 6–9, there will be described a routine which is executed by the CPU 24 to register the patterns of the call signals corresponding to the respective telephone numbers. This routine can be executed only after the D/R SET mode is selected by using the FUNCTION key 44 and the SELECTOR keys 46 as described above. With the facsimile system 10 thus placed in the D/R SET mode, each of the call signals CI having respective specific patterns are received one after another from a telephone exchange company in response to calls from a remote telephone or facsimile transmitter, for the purpose of registering the call signal patterns. As a result, an affirmative decision (YES) is obtained in the first step S1 of the pattern registering routine of FIGS. 6 and 7, and the control flow goes to step S2. Step S1 is repeatedly implemented until the call signal CI is received by the facsimile system 10. The call signals CI corresponding to the respective telephone numbers used by the facsimile system 10 have different patterns (ON-OFF patterns) as indicated at (a) through (d) in FIG. 20 by way of example. All of the call signals CI have a predetermined frequency in the ON state, and therefore each call signal CI received can be recognized as the call signal calling the appropriate telephone number.

For instance, where the telephone number [1111] is used exclusively for facsimile reception while the telephone numbers [2222] and [3333] are used exclusively for telephone communication by Mr. A and Mr. B, respectively, the call signals calling these telephone numbers are transmitted from the telephone exchange company upon calling from a remote telephone or facsimile transmitter as the calling party. When the call signal CI calling one of these telephone numbers is received, step S2 is implemented to activate the display 50 to provide an indication "CALL SIGNAL RECEIVED", and activate the speaker 26 to generate a ringing sound corresponding to the pattern of the received call signal CI. Then, the control flow goes to step S3 to execute a sub-routine for detecting or analyzing the pattern of the received call signal CI.

Figure 6:
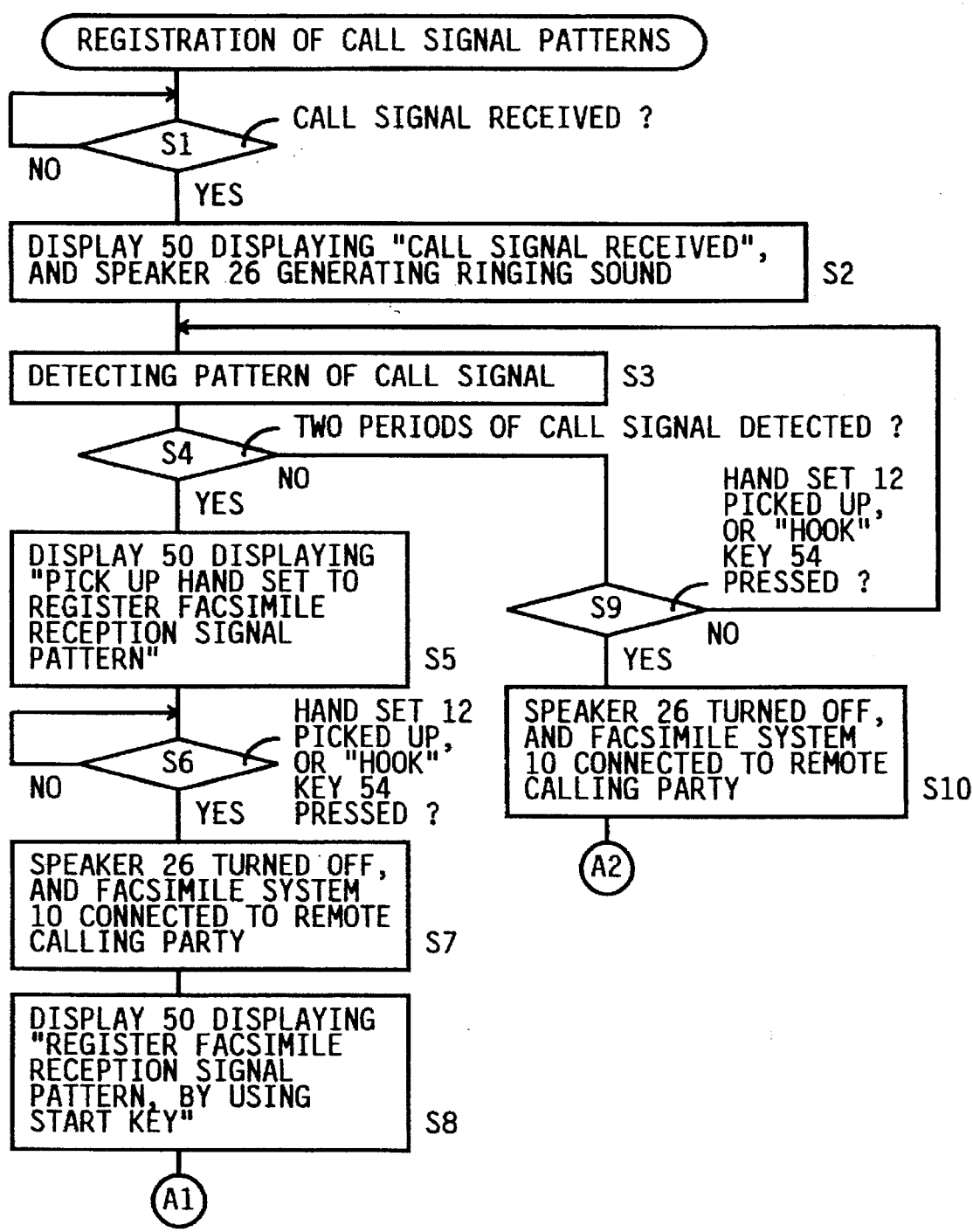
FIGS. 6 and 7 are flow charts illustrating a routine for registering the pattern of a facsimile reception call signal for facsimile reception in the facsimile system of FIG. 1.
Figure 8:
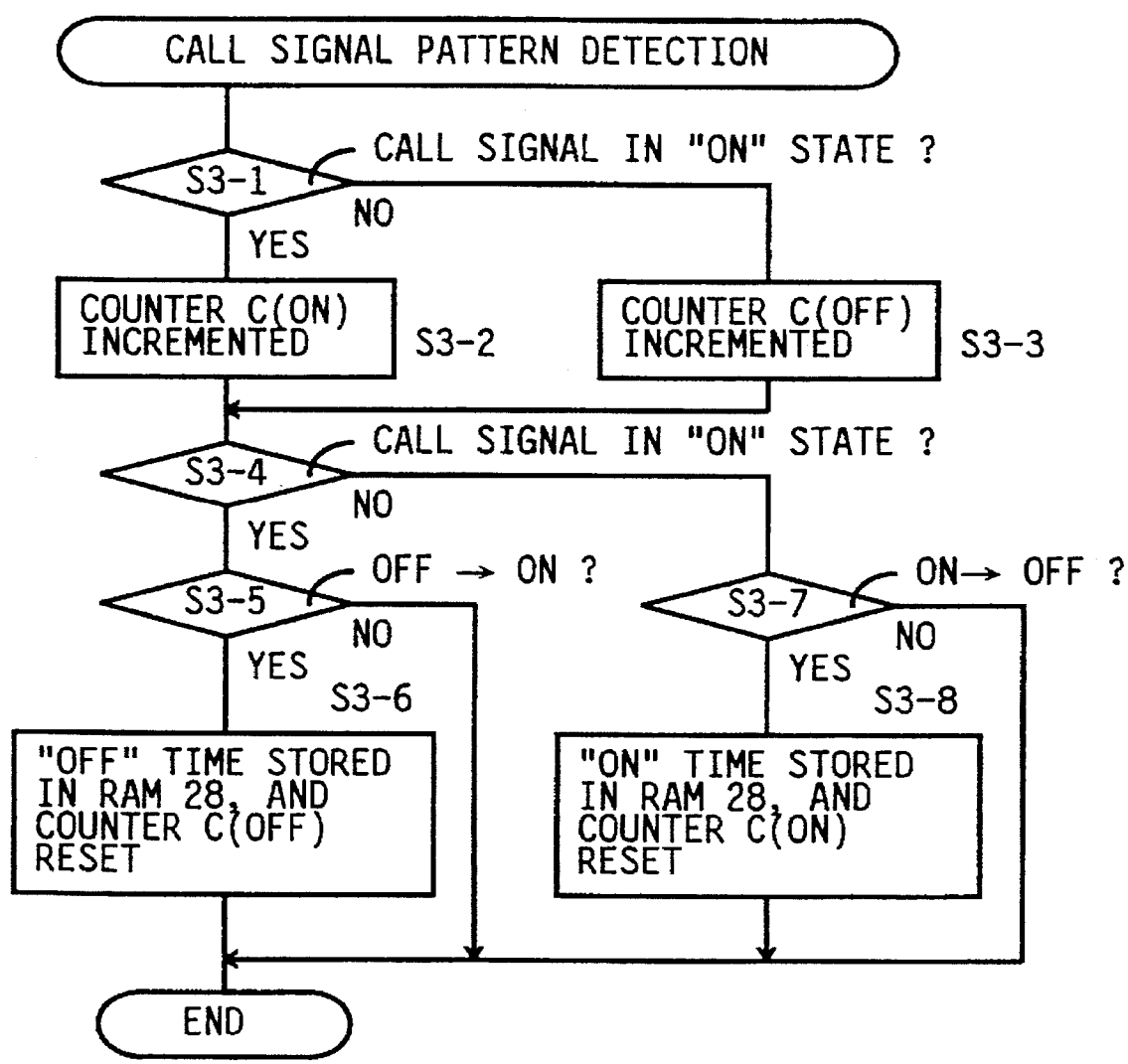
FIG. 8 is a flow chart illustrating a sub-routine executed in step S3 of the routine of FIGS. 6 and 7.

The sub-routine of step S3 is illustrated in the flow chart of FIG. 8. This sub-routine is initiated with step S3-1 to determine whether the call signal CI is in the ON state or not. This determination is made based on the frequency of the received call signal. If the call signal CI is in the ON state, step S3-2 is implemented to increment a counter C(ON). If the call signal CI is in the OFF state, step S3-3 is implemented to increment a counter C(OFF). These counters C(ON) and C(OFF) are both reset to zero before the routine of FIGS. 4–5 is executed, and also in steps S3-8 and S3-6, respectively. In the main routine of FIGS. 4–5, steps S3, S4 and S9 are repeatedly implemented at a predetermined cycle time until an affirmative decision (YES) is obtained in step S4 or S9. That is, the sub-routine of FIG. 6 is repeatedly executed at the predetermined cycle time, and the counter C(ON) or C(OFF) is selectively incremented each time the sub-routine S3-1 is repeatedly executed. Thus, the ON-time and OFF-time of the received call signal CI are measured in the form of the counts of the counters C(ON) and C(OFF). In other words, the contents of the counters C(ON) and C(OFF) represent the ON- and OFF-times of the call signal CI, namely, the pattern of the call signal CI.

Step S3-2 and S3-3 are followed by step S3-4 to determine again whether the call signal CI is in the ON state or not. The decision obtained in step S3-1 may be utilized in this step S3-4. If an affirmative decision (YES) is obtained, the control flow goes to step S3-5 to determine whether the state of the call signal CI has been just turned from OFF to ON, that is, is changed to ON in the present cycle of execution of the sub-routine of FIG. 8 (routine of FIGS. 6 and 7). This determination is made on the basis of the content of a flag indicating the state of the call signal CI in the last cycle. If an affirmative decision (YES) is obtained in step S3-5, step S3-6 is implemented to store in the RAM 28 data representative of the content or count of the counter C(OFF), that is, the OFF time of the call signal CI, and then reset the counter C(OFF) to zero. If a negative decision (NO) is obtained in step S3-5, that is, if the call signal CI remains ON, the sub-routine of FIG. 8 is terminated, and the control flow goes to step S4 of the main routine. If a negative decision (NO) is obtained in step S3-4, that is, if the state of the call signal CI is currently OFF, the control flow goes to step S3-7 to determine whether the state of the call signal CI has been just turned from ON to OFF, that is, is changed to OFF in the present cycle. This determination is also made on the basis of the flag indicating the state of the call signal in the last cycle. If an affirmative decision (YES) is obtained in step S3-7, step S3-8 is implemented to store in the RAM 28 data representative of the content or count of the counter C(ON), that is, the ON time of the call signal CI, and then reset the counter C(ON) to zero. If a negative decision (NO) is obtained in step S3-8, namely, if the call signal CI remains OFF, the sub-routine of FIG. 6 is terminated, and the control flow goes to step S4 of the main routine.

Figure 7:
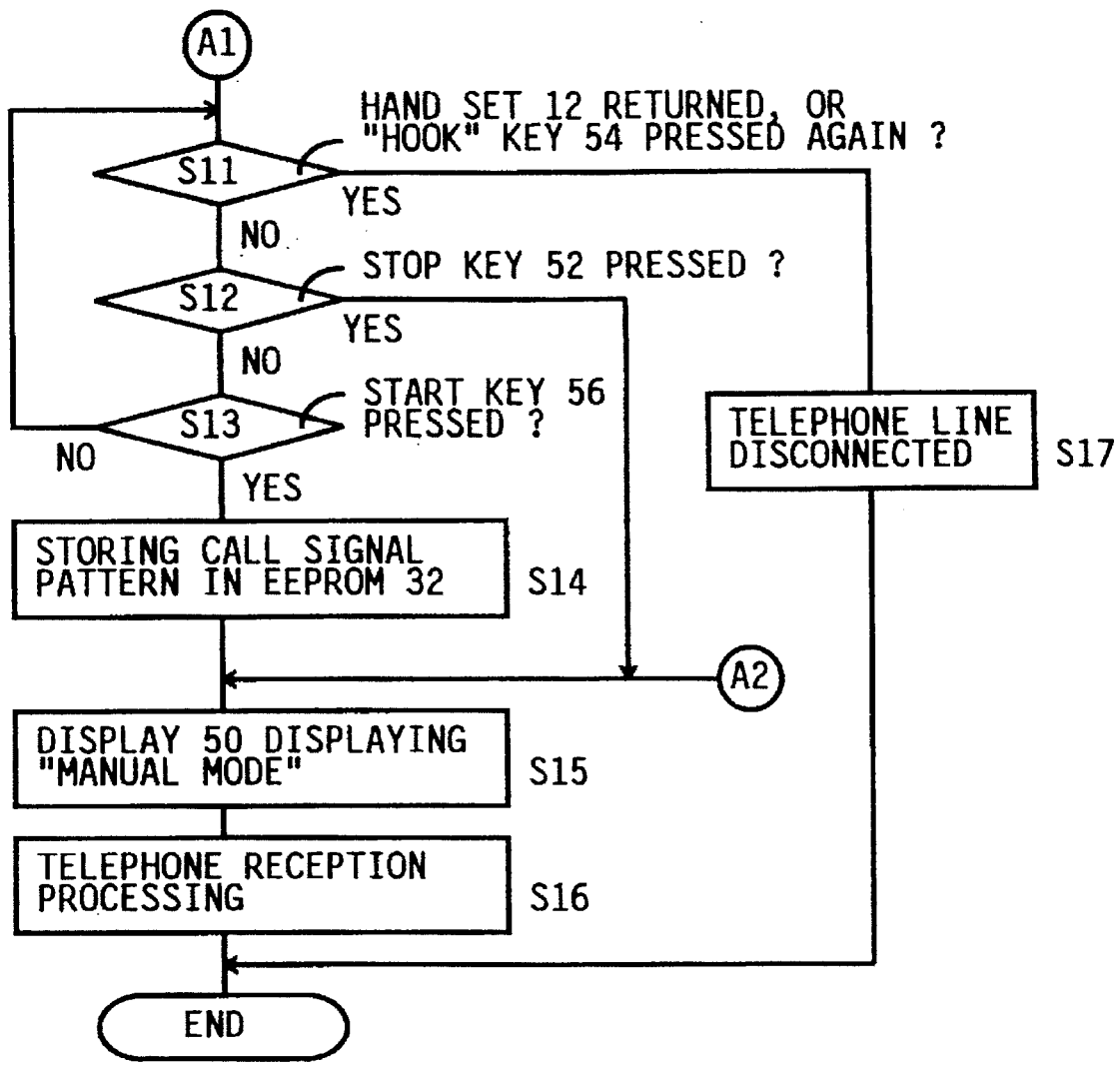

Step S3 described above by reference to FIG. 8 is followed by step S4 to determine whether the two periods of the call signal CI have been analyzed. If an affirmative decision (YES) is obtained in step S4, the control flow goes to step S5. If a negative decision (NO) is obtained in step S4, the control flow goes to step S9. The determination in step S4 is made by checking if the RAM 28 has stored the pattern data representative of two occurrences of an ON-OFF pattern consisting of the alternate ON and OFF times (states) as indicated at (a)–(d) in FIG. 10. However, the determination may be made by checking if two long OFF states of the call signal CI have been detected. In this respect, it is noted that all the call signal CI have one comparatively long OFF state time. If a negative decision (NO) is obtained in step S4, the control flow goes to step S9 to determine whether the telephone hand set 12 has been picked up or a HOOK key 54 on the panel 40 has been pressed. The hand set 12 may be picked up by the user or the HOOK key 54 may be pressed by the user if the user does not recognize that the facsimile system 10 is now placed in the D/R SET mode. If a negative decision (NO) is obtained in step S9, the control flow goes back to step S3. If the hand set 12 has been picked up or the HOOK key 54 is turned ON by mistake by the user, step S10 is implemented to turn off the speaker 26, and connect the facsimile system 10 as the called party to a remote facsimile system as the calling party. Step S10 is followed by step S15 (FIG. 7).

In step S5 which is implemented if the affirmative decision (YES) is obtained in step S4, the display 50 provides a message "PICK UP HAND SET 12 TO REGISTER CALL SIGNAL PATTERN". Step S5 is followed by step S6 to determine whether the hand set 12 has been picked up or the HOOK key 54 has been pressed. If an affirmative decision (YES) is obtained in step S6, the control flow goes to step S7 to turn off the speaker 26 and connect the facsimile system 10 to the remote facsimile system. Then, step S8 is implemented to activate the display 50 to provide a message "REGISTER CALL SIGNAL PATTERN". Step S8 is followed by step S11 (FIG. 7) to determine whether the hand set 12 has been returned in place or the HOOK key 54 has been pressed again by mistake by the user. If an affirmative decision (YES) is obtained in step S11, the control flow goes to step S17 to disconnect the facsimile system 10 from the remote facsimile system, and one cycle of execution of the routine is terminated. If a negative decision (NO) is obtained in step S11, the control flow goes to step S12 to determine whether the STOP key 52 has been pressed. If the key 52 is on, step S12 is followed by step S15. The STOP key 52 is used to cancel the registration of the pattern of the call signal CI as detected or analyzed in step S3, for some reason or other. For instance, the user presses the STOP key 52 if the user finds that the ringing sound generated by the speaker 26 in step S2 is different from that of the call signal assigned to call the telephone number exclusively used for the facsimile signal reception, namely, the call signal CI received calls the telephone number which is not exclusively used for the facsimile signal reception. If a negative decision (NO) is obtained in step S12, the control flow goes to step S13 to determine whether a START key 56 has been pressed. Steps S11–S13 are repeatedly implemented until an affirmative decision (YES) is obtained in any one of these steps. If an affirmative decision is obtained in step S13, step S14 is implemented to store in the call pattern memory section 32a of the EEPROM 32 the pattern of the call signal CI as detected in step S3, more precisely, the ON and OFF times corresponding to one period of the call signal CI, which are stored in the RAM 28.

Figure 9:
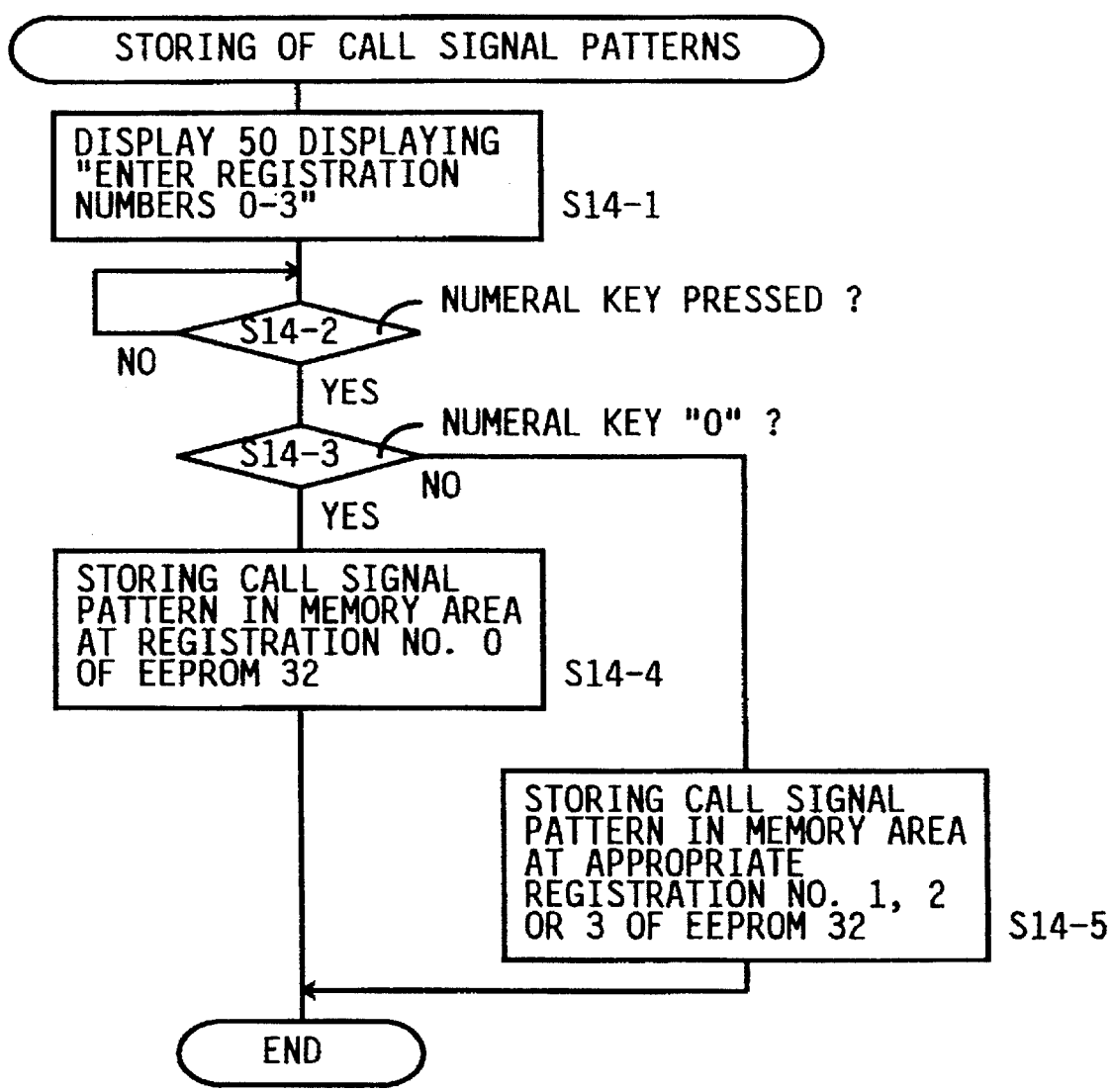
FIG. 9 is a flow chart illustrating a sub-routine executed in step S14 of the routine of FIGS. 6 and 7 to store the call signal patterns in the EEPROM of FIG. 2.

Step S14 is formulated as a sub-routine as illustrated in the flow chart of FIG. 9. The sub-routine of FIG. 9 is initiated with step S14-1 to activate the display 50 to provide a display "ENTER REGISTRATION NUMBER [0], [1], [2] OR [3]". Step S14-1 is followed by step S14-2 to determine whether any data are keyed in, more specifically, any of the numeral keys 42 corresponding to the numerals "0" through "3" has been pressed. When the pattern of the call signal calling the facsimile reception telephone number [1111] is registered, the numeral key 42 corresponding the numeral "0" is pressed. Similarly, the numeral keys 42 corresponding to the numerals "1" and "2" are pressed to register the patterns of the call signals calling the telephone numbers [2222] and [3333] used by Messrs. A and B, respectively. If any numeral key 42 corresponding to the numeral "0", "1" or "2" is pressed, the control flow goes to step S14-3 to determine whether the numeral key 42 corresponding to the numeral "0" has been pressed. If an affirmative decision (YES) is obtained in step S14-3, the control flow goes to step S14-4 in which the pattern of the facsimile reception call signal detected in step S3 (sub-routine of FIG. 8) is stored in the memory area corresponding to the registration number [0] of the call pattern memory section 32a of the EEPROM 70. If a negative decision (NO) is obtained in step S14-3, the control flow goes to step S14-5 in which the pattern of the call signal stored in step S3 is stored in the call pattern memory section 32a which corresponds to the registration number designated in step S14-2. The completion of step S14 results in automatic cancellation of the D/R SET mode.

Step S14 is followed by step S15 to activate the display 50 to provide an indication "MANUAL MODE", and step S16 to permit telephone communication with the remote party calling the appropriate telephone number, without activating the speaker 26. In this respect, it is noted that the hand set 12 has already been picked up or the HOOK key 54 has already been pressed in step S6, whereby the facsimile system 10 has been connected to the remote telephone set. In this MANUAL reception mode, the facsimile system 10 may receive and process a facsimile signal from the remote facsimile transmitter, if the START key 56 is pressed, as described later with respect to step R10 of FIG. 13.

Figure 10:
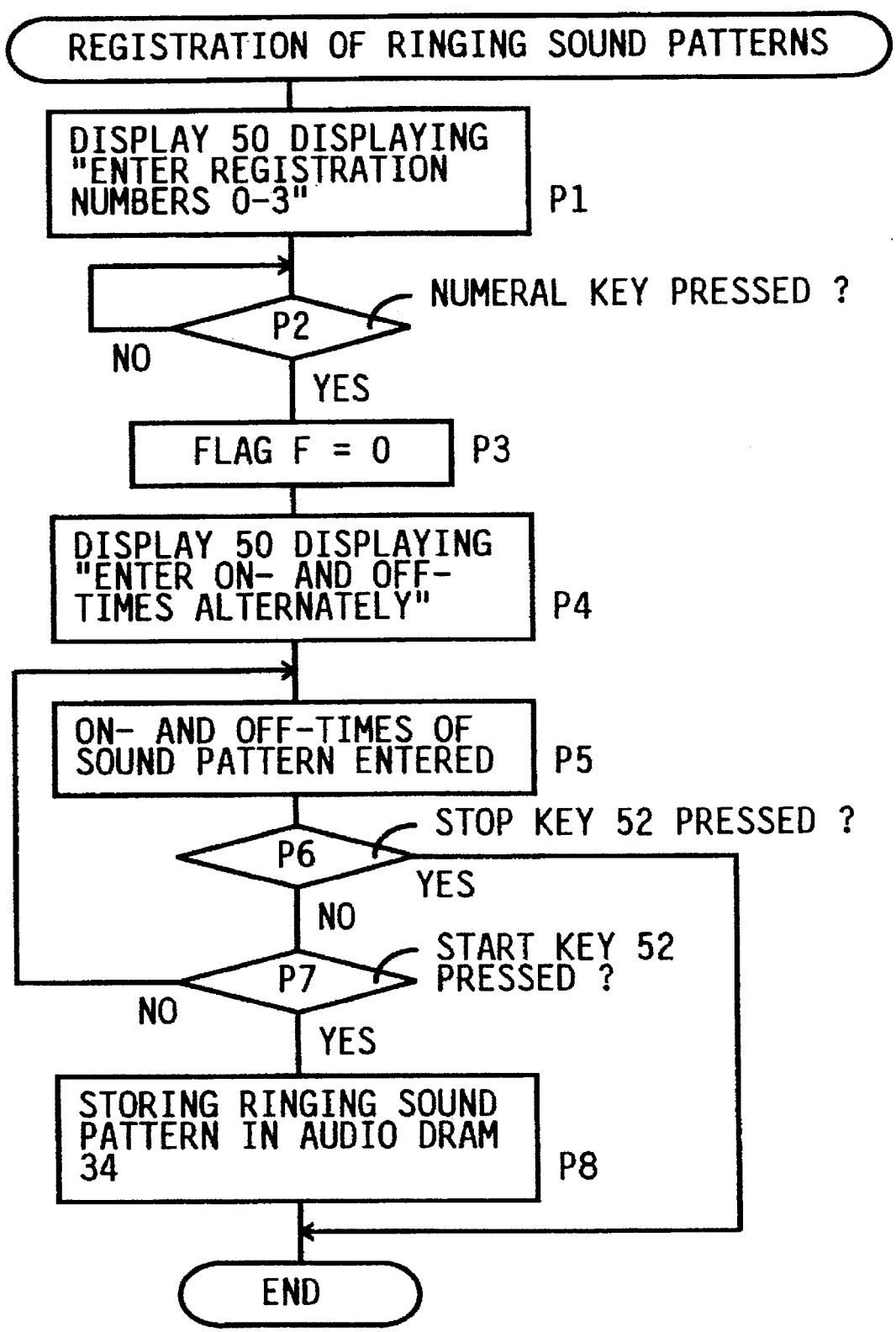
FIG. 10 is a flow chart illustrating a routine for storing patterns of ringing sounds in a RING PATTERN SET mode in the facsimile system of FIG. 1.

The patterns of the ringing sounds may be stored in the ring pattern memory section 32b of the EEPROM 32 while the facsimile system 10 is placed in the RING PATTERN SET mode, which can be established by pressing the FUNCTION key 44 and the SELECTOR keys 46. In the RING PATTERN SET mode, a routine illustrated in the flow chart of FIG. 10 is executed, beginning with step P1 in which the display 50 provides a message "ENTER REGISTRATION NUMBER (0–9)". Step P1 is followed by step P2 to determine whether any of the numeral keys of the FUNCTION/NUMERAL keys 42 has been pressed. When the patterns of the ringing sounds corresponding to the telephone numbers used by Mr. A and Mr. B are to be registered, the numeral keys "1" and "2" of the FUNCTION/NUMERAL keys 42 are pressed. Similarly, the numeral keys "4", "5" and "6" are pressed when the patterns of the ringing sound corresponding to the telephone numbers used by Messrs. C, D and E are to be registered.

If an affirmative decision (YES) is obtained in step P2, the control flow goes to step P3 in which a flag F is reset to "0". Step P3 is followed by step P4 in which the display 50 provides a message "ENTER ON- and OFF-TIMES ALTERNATELY". Step P4 is followed by step P5 in which the ON-times and OFF-times of the ringing sound patterns are entered through the numeral keys of the FUNCTION/NUMERAL keys 42. For instance, a one-second time may be entered by pressing the numeral key "1" of the FUNCTION/NUMERAL keys 42, and a two-second time may be entered by pressing the numeral key "2".

Figure 11:
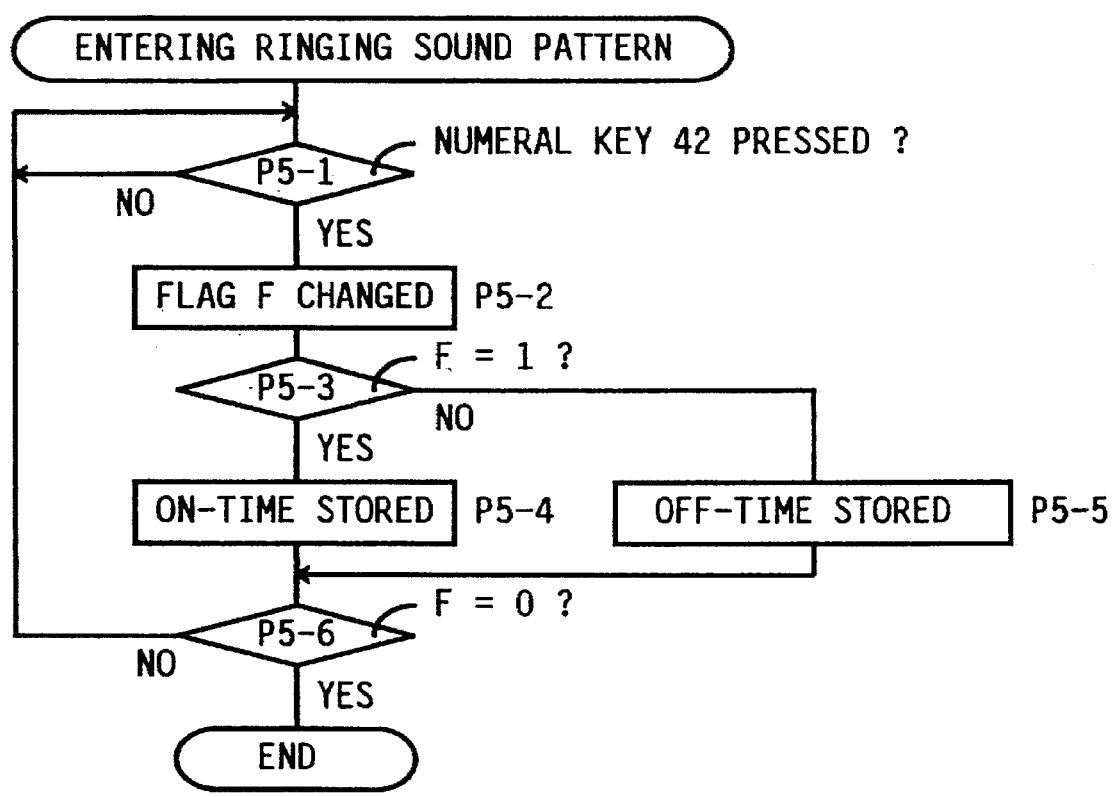
FIG. 11 is a flow chart illustrating a sub-routine executed in step P5 of the routine of FIG. 10.

Step P5 is implemented as a sub-routine illustrated in FIG. 11. The sub-routine is initiated with step P5-1 to determine whether any numeral key 42 has been pressed. If an affirmative decision (YES) is obtained in step P5-1, the control flow goes to step P5-2 to change the state of the flag F. If the flag F is currently set at "1", the flag F is reset to "0". If the flag F is currently set at "0", the flag F is set to "1". In the first cycle of execution of this sub-routine, the flag F is set to "1" since it has been reset to "0" in step P3. Then, step P5-3 is implemented to determine whether the flag F is set at "1". If the flag F is set at "1", the control flow goes to step P5-4 in which the time entered in step P5-1 is stored in the RAM 28 as an ON-time of the ringing sound pattern corresponding to the registration number specified in step P1. If the flag F is set at "0", the control flow goes to step P5-5 in which the entered time is stored in the RAM 28 as an OFF-time of the pattern in question. Step P5-4 and P5-5 are followed by step P5-6 to determine whether the flag F is set at "0". Unless an affirmative decision (YES) is obtained in step P5-6, the control returns to step P5-1. The sub-routine of FIG. 11 is repeatedly executed until the affirmative decision (YES) is obtained in step P5-6. Thus, a pair of ON- and OFF-times are stored in the RAM 28.

If the affirmative decision (YES) is obtained in step P5-6, the control flow goes to step P6 of the routine of FIG. 10 to determine whether the STOP key 52 has been pressed. If the STOP key 52 is pressed, the routine of FIG. 10 is terminated without storing any ringing sound pattern. If a negative decision (NO) is obtained in step P6, step P7 is implemented to determine whether the START key 56 has been pressed. If the START key 56 has not been pressed, the control flow returns to step P5, and steps P5-P7 are repeatedly implemented until the START key 56 has been pressed. Thus, more than two pairs of ON- and OFF-times of the ringing sound pattern may be stored in the RAM 28. If the START key 56 has been pressed, the control flow goes to step P8 in which the ON-OFF pattern of the ringing sound stored in the RAM 28 in step P5 is registered in the memory area of the ring pattern memory area 32b of the EEPROM 32, which corresponds to the registration number specified by the number entered in step P2. After one cycle of execution of the routine of FIG. 10 is completed, the RING PATTERN SET mode is automatically cancelled, and the display 50 provides an indication "8. RING PATTERN". If the STOP key 52 is pressed in this condition, the facsimile system 10 is placed in the normal operation mode. If the key labelled "SET" of the SELECTOR keys 46 is pressed, the RING PATTERN SET mode is again established, and the pattern of the ringing sound corresponding to another telephone number can be registered in the memory area of the ring pattern memory section 32b which corresponds to the registration number specified in step P1.

Figure 12:
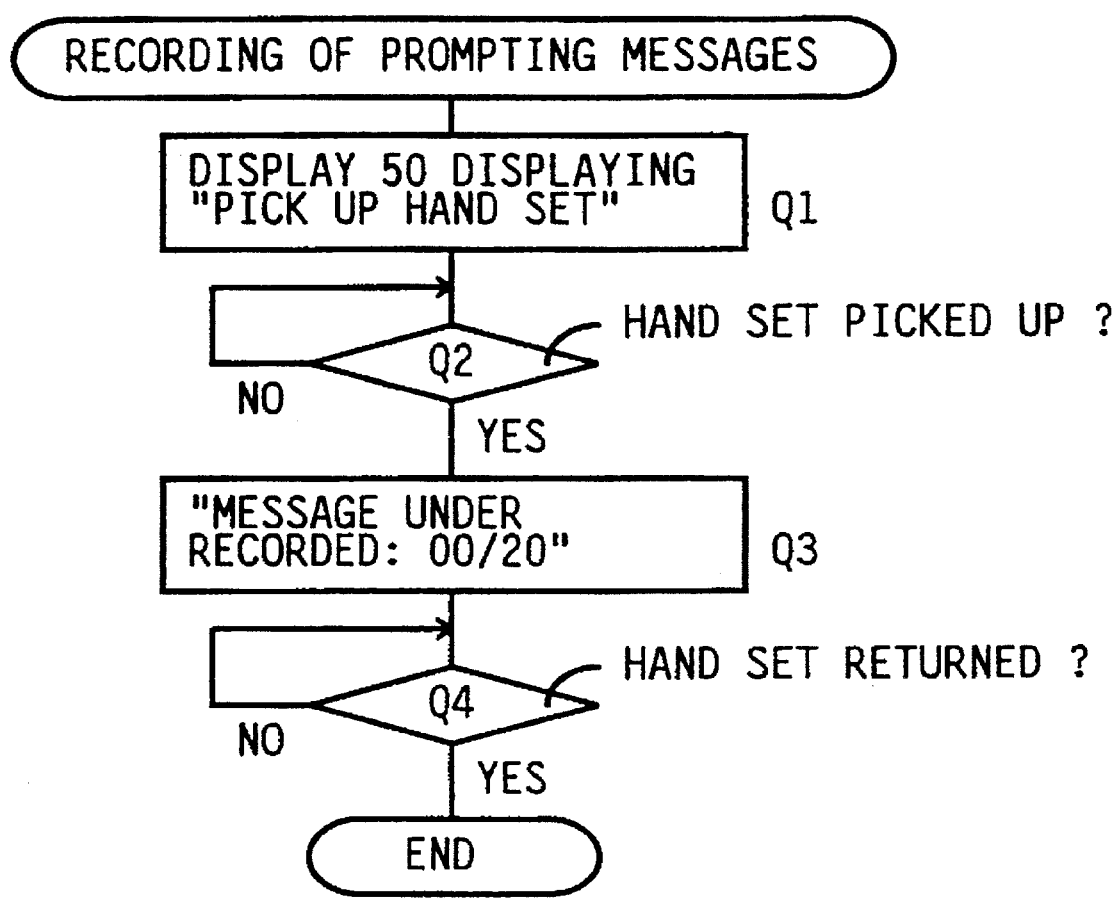
FIG. 12 is a flow chart illustrating a routine for storing call messages in a MESSAGE SET mode in the facsimile system of FIG. 1.

The prompting message described above with respect to the audio DRAM 34 may be recorded in the appropriate memory area of the audio DRAM 34, according to a routine illustrated in the flow chart of FIG. 12, while the facsimile system 10 is placed in the MESSAGE SET mode, which can also be established by the FUNCTION key 44 and the SELECTOR keys 46. The routine of FIG. 12 is initiated with step Q1 in which the display 50 is activated to provide a display "PICK UP HAND SET". Step Q1 is followed by step Q2 to determine whether the hand set 12 has been picked up. If an affirmative decision (YES) is obtained in step Q2, step Q3 is implemented in which the display 50 provides an indication "MESSAGE UNDER RECORDING", which means that an prompting message may be recorded through a microphone of the hand set 12. In this condition, the user speaks a desired prompting message to the microphone of the hand set 12, and message data representative of the message is recorded in the appropriate memory area of the audio DRAM 34. For instance, a prompting message "Please press the numeral key "1" to speak with Mr. A, numeral key "2" to speak with Mr. B, or numeral key "4" to speak with Mr. C.". Step Q3 is followed by step Q4 to determine whether the hand set 12 has been returned in place. If the hand set 12 is returned, the MESSAGE SET mode is automatically cancelled.

Figure 13:
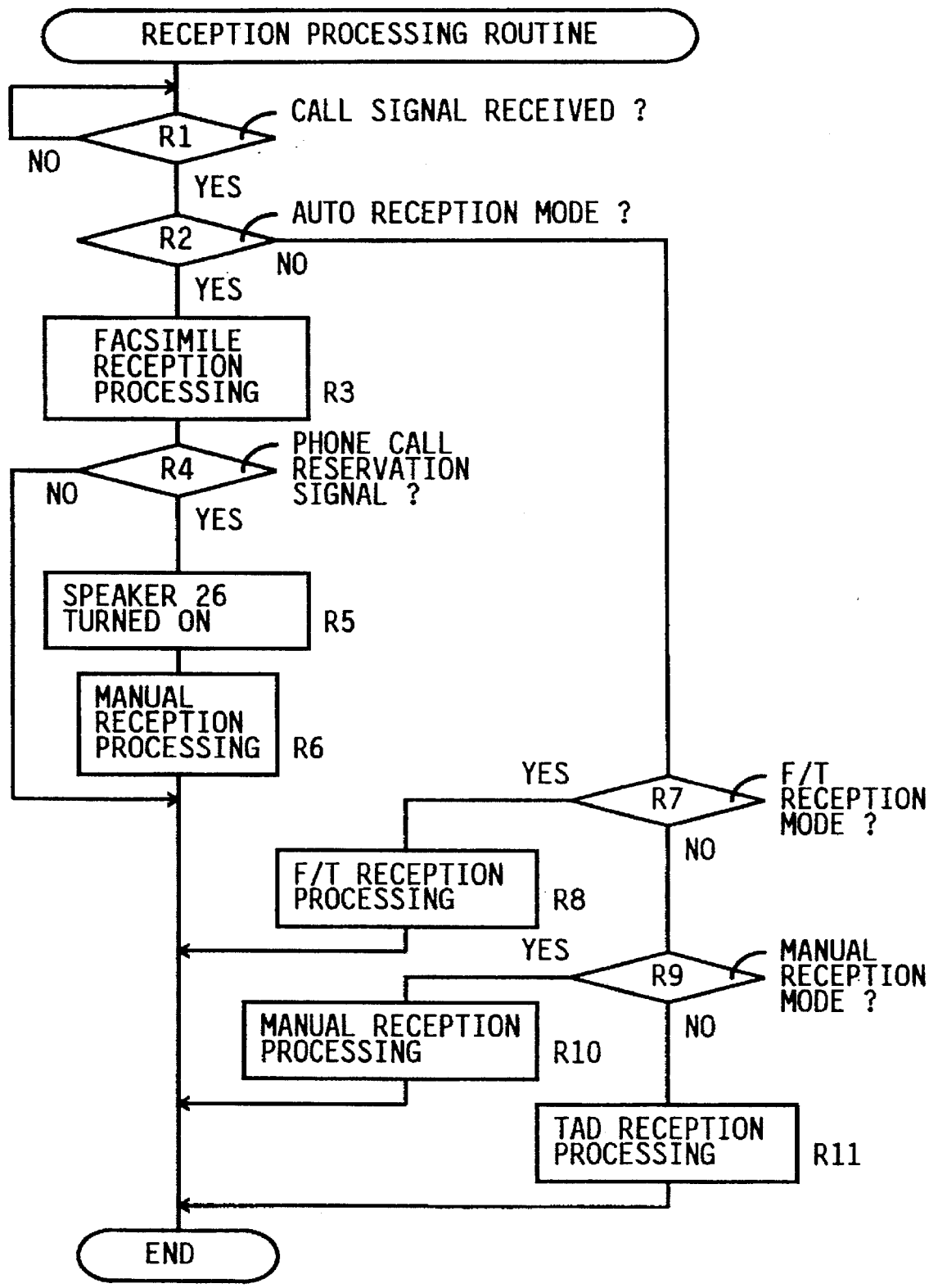
FIG. 13 is a flow chart illustrating a routine executed upon reception of a call signal.

When the facsimile system 10 is not placed in any one of the D/R SET, RING PATTERN SET and MESSAGE SET modes, that is, when the facsimile system 10 is placed in the normal operation mode, a reception processing routine of FIG. 13 is executed to process the received call signal CI and a facsimile or telephone signal. The routine of FIG. 13 is initiated with step R1 to determine whether any call signal CI has been received, as in step S1 of the routine of FIGS. 6-7. If an affirmative decision (YES) is obtained in step R1, the control flow goes to step R2 to determine whether the facsimile system 10 is placed in the AUTO reception mode. This determination is made on the basis of the data stored in the RAM 28, which represent the currently selected reception mode. If the AUTO reception mode is not currently selected, step R7 is implemented. If the AUTO reception mode is selected, the control flow goes to step R3 in which the facsimile system 10 is automatically connected to the remote facsimile system, and a facsimile signal received from the remote facsimile system is automatically processed for recording of an image represented by the received facsimile signal. Step R3 is followed by step R4 to determine whether a phone call reservation signal has been received from the remote facsimile system. The phone call reservation signal is generated by pressing of a CALL RESERVATION key 62 provided on the panel 40 (FIG. 5) of the remote facsimile system at the calling party. The phone call reservation signal indicates that the calling party wants to speak with the called party by telephone before or during the facsimile signal transmission. If the phone call reservation signal has not been received, the routine of FIG. 13 is terminated. If an affirmative decision (YES) is obtained in step R4, the control flow goes to step R5 in which the speaker 26 is activated to generate the ringing sound whose pattern is registered in the memory area corresponding to the registration number [9] of the ring pattern memory section 32b of the EEPROM 32. Step R5 is followed by step R6 in which telephone communication is made possible if the hand set 12 is picked up or the HOOK key 54 is pressed.

If the currently selected reception mode is not the AUTO reception mode, namely, if a negative decision (NO) is obtained in step R2, the control flow goes to step R7 to determine whether the facsimile system 10 is now placed in the F/T reception mode. If an affirmative decision (YES) is obtained in step R7, a F/T reception processing sub-routine is executed in step R8 as illustrated in the flow chart of FIGS. 14 and 15.

Figure 14:
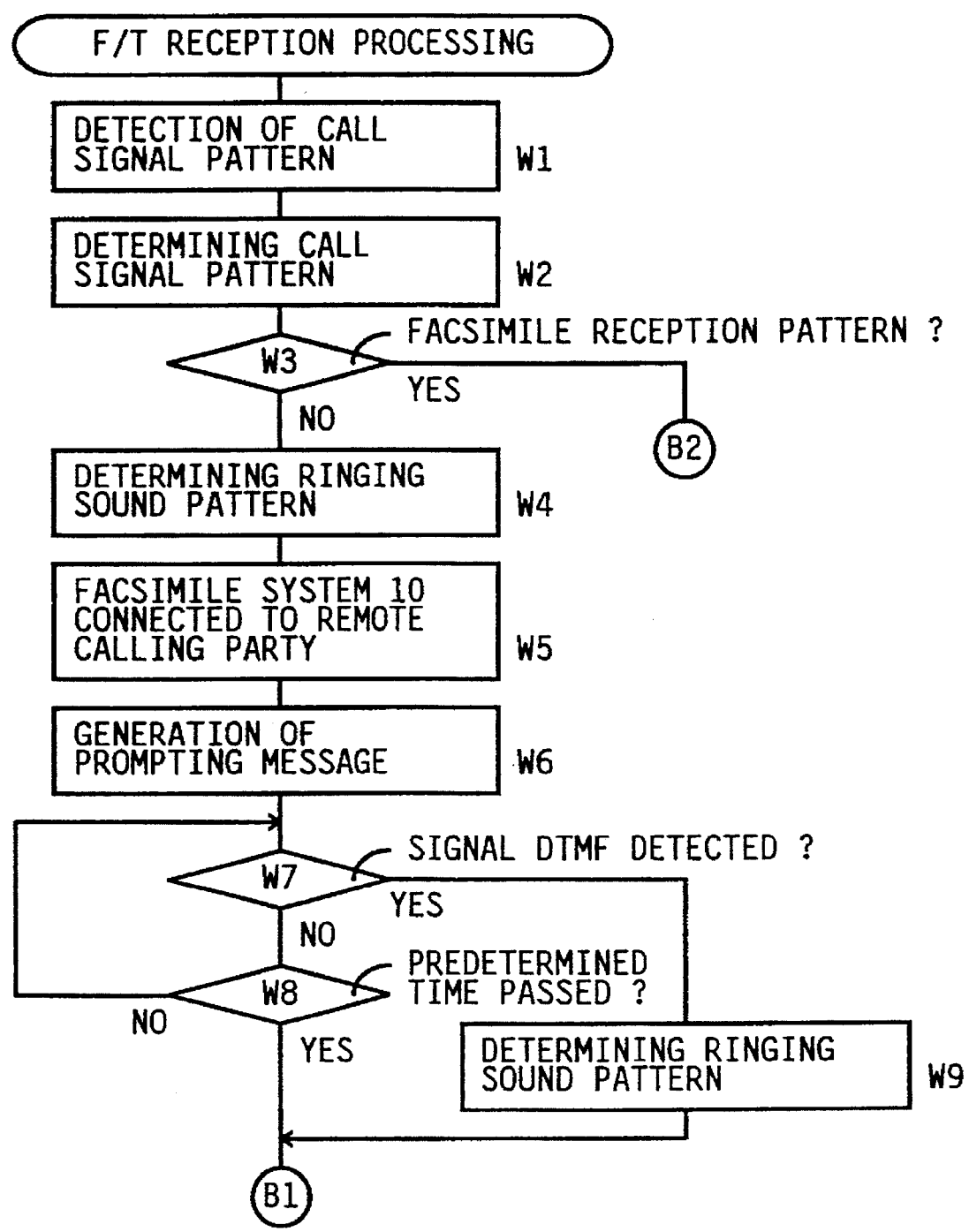
FIGS. 14 and 15 are flow charts illustrating a sub-routine executed in step R8 of the routine of FIG. 13.
Figure 15:
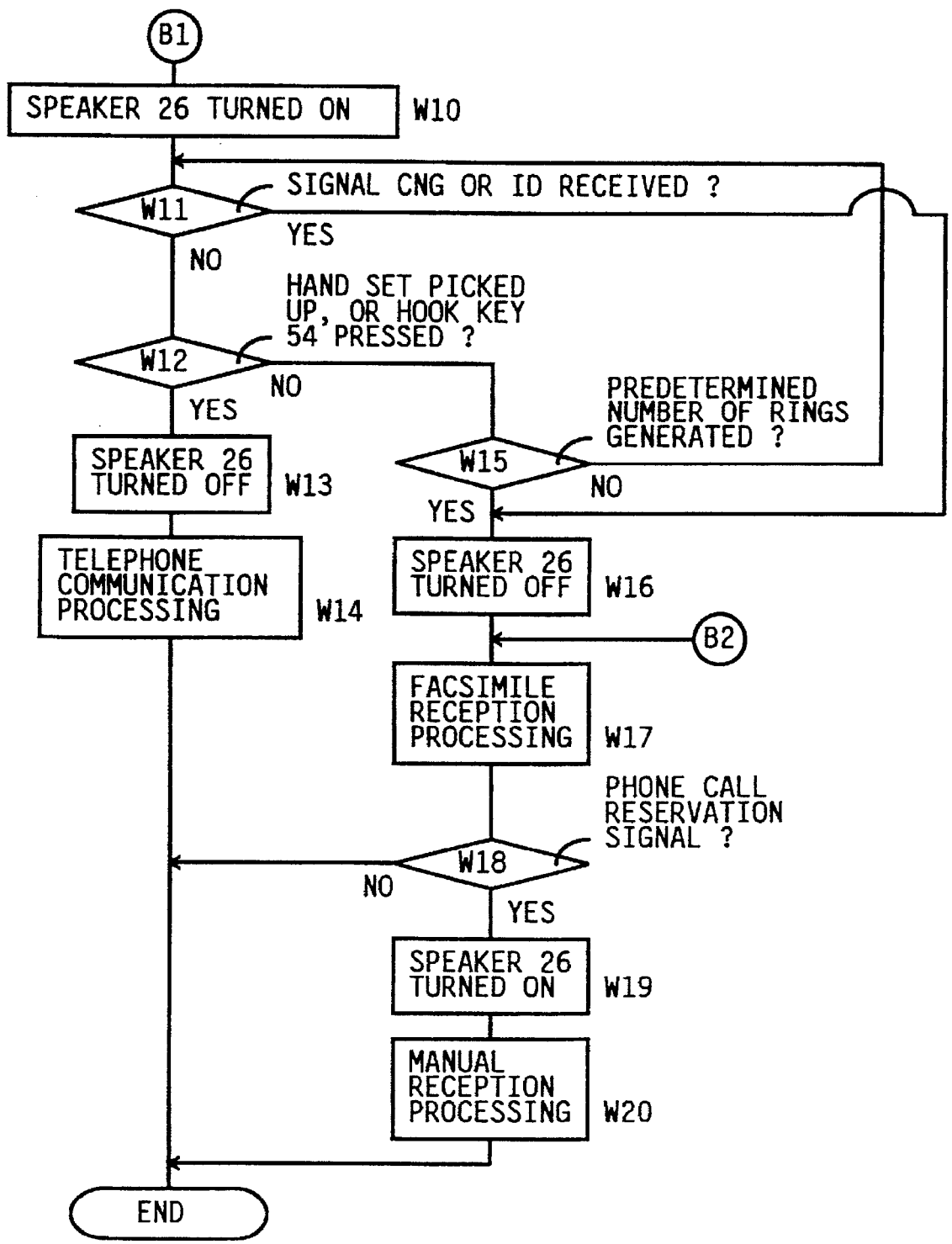
Figure 16:
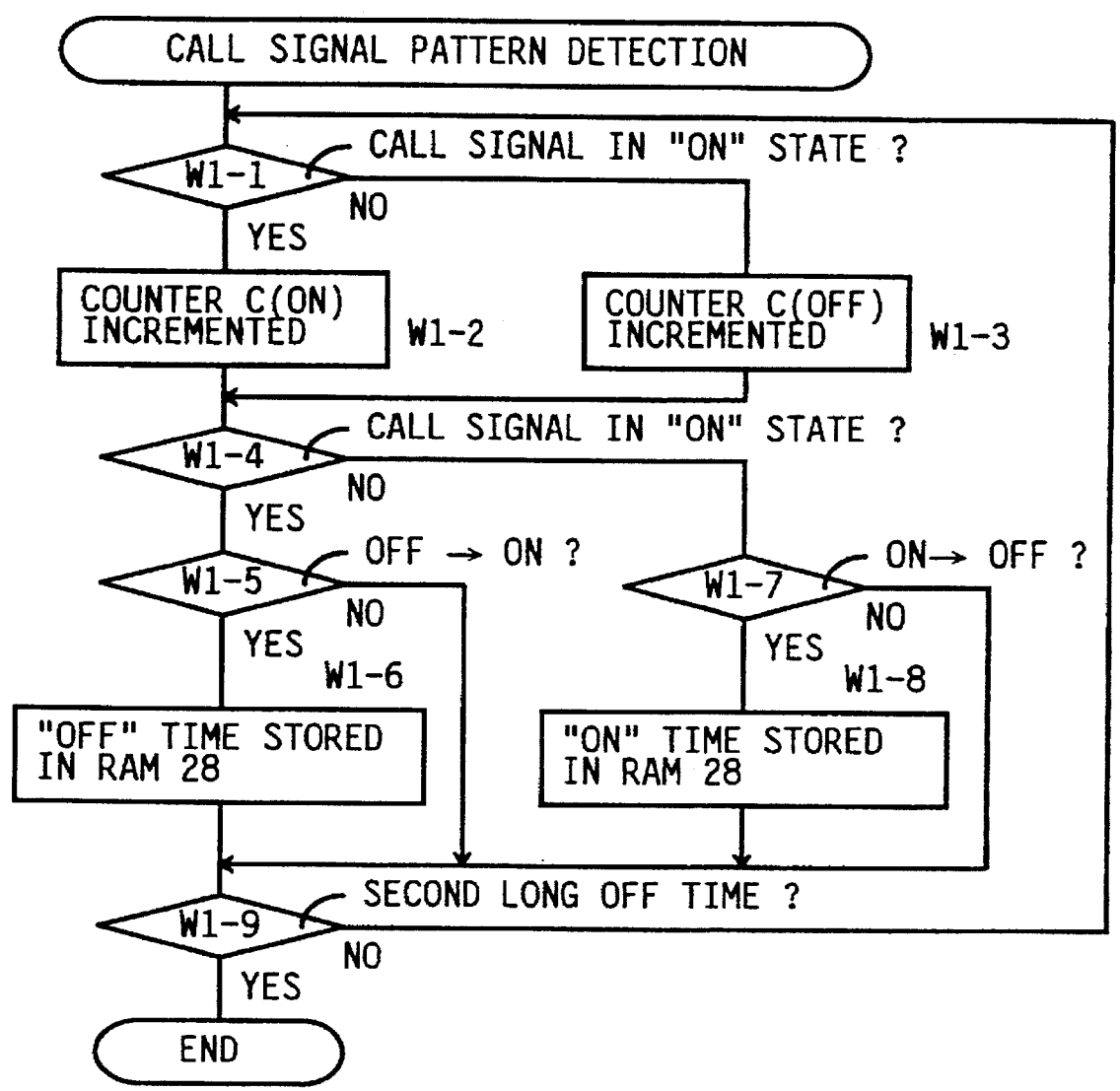
FIG. 16 is a flow chart illustrating a sub-routine executed in step W1 of the routine of FIGS. 14 and 15.
Figure 20A:
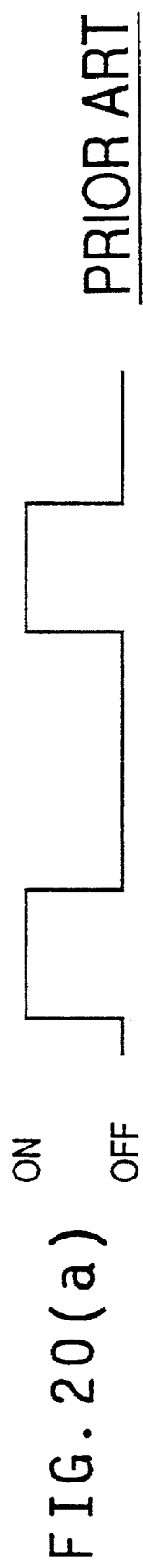
FIGS. 20(a)–20(d) are a view showing examples of call signals having different patterns.
Figure 20B:
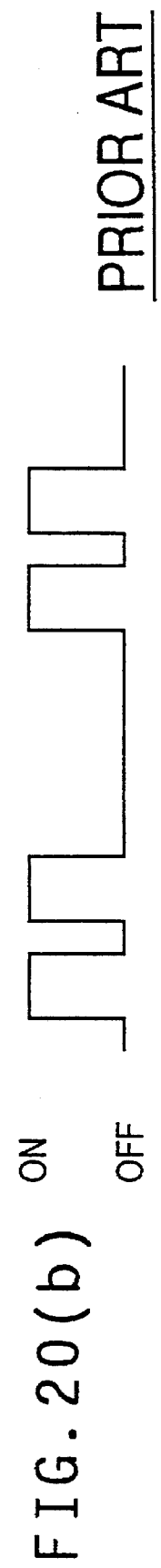
Figure 20C:
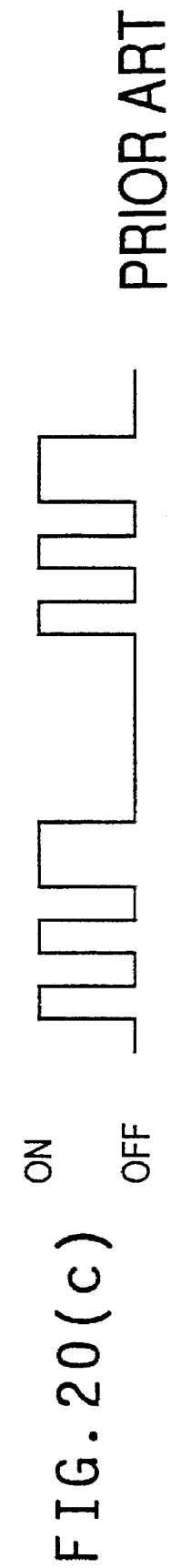
Figure 20D:
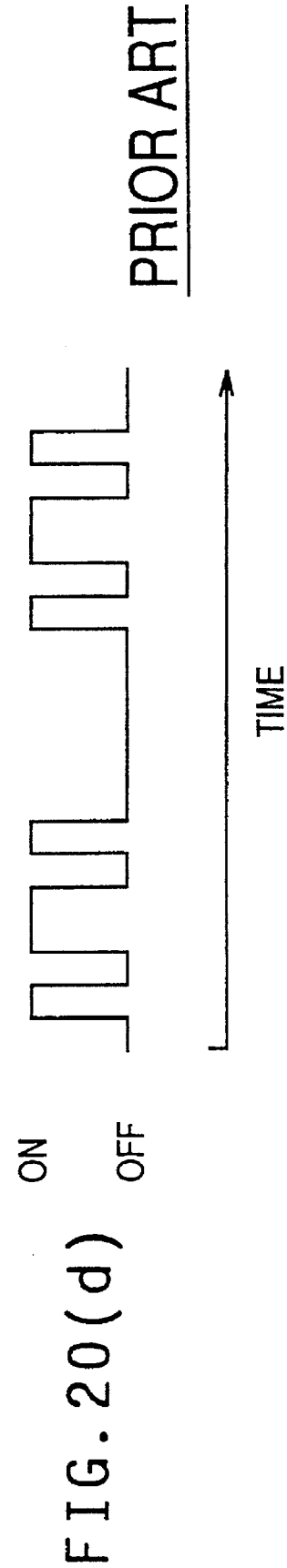

The sub-routine of FIGS. 14 and 15 is initiated with step W1 to detect the pattern of the received call signal CI. In step W1, steps W1-1 through W1-8 similar to steps S3-1 through S3-8 of FIG. 8 are implemented, so that the ON- and OFF-times of the pattern of the received call signal CI are measured by the counters C(ON) and C(OFF) and stored in the RAM 28. Steps W1-6 and W1-8 are followed by step W1-9 to determine whether two long OFF-times of the received signal have been detected, that is, whether one period of the call signal CI has been detected. The sub-routine of FIG. 16 is repeatedly executed until an affirmative decision (YES) is obtained in step W1-9. When the affirmative decision is obtained in step W1-9, the control flow goes to step W2 of the routine of FIG. 14 to detect or analyze the pattern of the received call signal CI.

In step W2, the number of the ON- and OFF-times of one period of the call signal which have been stored in the RAM 28 in steps W1-6 and W1-8 is compared with that of each of the call signals stored in the call pattern memory section 32a of the EEPROM 32. If the number of the ON- and OFF-times stored in the RAM 28 is not the same as those of any call signals in the call pattern memory section 32a, the control goes to a suitable processing including a step of informing the user that the pattern of the received call signal is different from all patterns stored in the call pattern memory section 32a. If the number of the ON- and OFF-times in the RAM 28 is the same as any one of the call signals stored in the call pattern memory section 32a, the ON- and OFF-times in the RAM 28 are compared with those of that call signal stored in the call pattern memory section 32a, to determine whether the ON-OFF pattern of the received call signal is the same as any call signal registered in the call pattern memory 32a. For example, step W2 is formulated to check whether the received call signal has the pattern of the registration number [0] for facsimile reception, or the pattern of the registration number [1] or [2] for telephone communication by Mr. A or Mr. B, in the case where the call pattern memory section 32a of the EEPROM 32 stores pattern data as indicated in FIG. 2.

Step W2 is followed by step R3 to determine whether the pattern of the received call signal is the facsimile reception pattern. If an affirmative decision (YES) is obtained in step W3, the control flow goes to step R17 in which a facsimile signal if received from the remote facsimile transmitter is automatically received and processed, so that an image is recorded on the recording medium by the image recorder 14 according to the processed facsimile signal. If a negative decision (NO) is obtained in step W3, the control flow goes to step W4 to determine the pattern of the ringing sound which corresponds to the pattern of the received call signal as detected in step W2. The registration number of the determined ringing sound pattern is stored in the RAM 28. Step W5 is then implemented to connect the facsimile system 10 to the remote facsimile system. Step W5 is followed by step W6 in which the prompting message stored in the audio DRAM 34 is transmitted to the remote facsimile system, more specifically, to the remote telephone receiver at the calling party. In response to the prompting message, the calling party may press, if necessary, one of the numeral keys "1", "2" and "4" through "6" of the FUNCTION/NUMERAL keys 42 on the panel 40, depending upon the person (one of Messrs. A through E) with whom the calling party wants to speak. As a result, a pattern designating signal in the form of a signal DTMF (dual-tone multifrequency signal) is generated by the remote calling party and is received by the facsimile system 10 as the called party. If a negative decision (NO) is obtained in step W7, step W8 is implemented to determine whether a predetermined time has passed after the generation of the prompting message in step W6. If an affirmative decision (YES) is obtained in step W8, the control flow goes to step W10 (FIG. 15). If the signal DTMF has been received and an affirmative decision (YES) is obtained in step W7, the control flow goes to step W9 to determine the numeral key of the FUNCTION/NUMERAL keys 42 which has been pressed at the calling party. This determination is effected based on the frequency of the received signal DTMF. Then, the pattern of the ringing sound (stored in the ring pattern memory section 32b) corresponding to the numeral key which has been pressed at the calling party is determined, and the registration number of the corresponding ringing sound pattern is stored in the RAM 28, in place of the registration number previously stored in step W4. The registration numbers stored in the RAM 28 in steps W4 and W9 may be the same or different from each other.

In step W10 (FIG. 15), the pattern data of the ringing sound are retrieved from the memory area of the ring pattern memory section 32b of the EEPROM 32, which memory area corresponds to the registration number stored in the RAM 28 in step W9 if the step W9 has been implemented, or in step W4 if the step W9 has not been implemented. The speaker 26 is activated to generate the ringing sound according to the retrieved pattern data. Thus, if any signal DTMF has not been received as the pattern designating signal, the speaker 26 generates the ringing sound whose pattern corresponds to one of the telephone numbers used by Mr. A and Mr. B. If the signal DTMF has been received, the pattern of the ringing sound generated by the speaker 26 is one of the patterns for Messrs. A through E stored in the memory areas corresponding to the registration numbers [1], [2] and [4] through [6] of the ring pattern memory section 32b of the EEPROM 32. Therefore, the users of the facsimile system 10 can find out who should respond to the ringing sound being generated, depending upon the specific type of the ringing sound.

Step W10 is followed by step W11 to determine whether a facsimile signal transmission signal CNG (calling tone signal) or a signal ID has been received. The signal CNG indicates that a facsimile signal will be transmitted from the remote facsimile transmitter, while the signal ID requests the facsimile system 10 to process the facsimile signal. If an affirmative decision (YES) is obtained, the control flow goes to step W16. If a negative decision (NO) is obtained in step W11, step W12 is implemented to determine whether the hand set 12 has been picked up or the HOOK key 54 has been pressed. If an affirmative decision (YES) is obtained in step W12, the control flow goes to step W13 to turn off the speaker 26, and then to step W14 in which telephone communication with the remote telephone set is made possible. If a negative decision (NO) is obtained in step W12, the control flow goes to step W15 to determine whether the ringing sounds have been generated a predetermined number of times. Steps W11, W12 and W15 are repeatedly implemented until an affirmative decision (YES) is obtained in step W15, that is, until the ringing sounds have been generated the predetermined number of times. The determination in step W15 may be based on the content of a counter which is incremented each time the ringing pattern is repeated, or the content of a timer which measures a time after the speaker 26 is turned on in step W10. In step W16, the speaker 26 is turned off. Step W16 is followed by step W17 in which the facsimile signal received from the remote facsimile transmitter is automatically received and processed for image recording by the image recorder 14. Step W17 is followed by steps W18–W20 which are identical with steps R4–R6 of the main routine of FIG. 13.

Referring back to the main routine of FIG. 13, step R9 is implemented if the facsimile system 10 is not placed in the F/T reception mode, that is, if a negative decision (NO) is obtained in step R7. Step R9 is provided to determine whether the facsimile system 10 is now placed in the MANUAL reception mode. If the MANUAL reception mode is selected, step R10 is implemented to effect manual reception processing, which includes activation of the speaker 26 to generate a ringing sound corresponding to the pattern of the call signal CI. According to this manual reception processing, the speaker 26 is turned off and telephone communication with a remote telephone transmitter/receiver is permitted if the hand set 12 is taken up or the HOOK key 54 is pressed. If a negative decision (NO) is obtained in step R9, this means that the facsimile system 10 is placed in the TAD reception mode, which is usually selected when the system 10 is left unattended by the user. When the system 10 is placed in the TAD reception mode, step R11 is implemented to effect TAD processing. According to this TAD processing, the facsimile system 10 is connected to the remote facsimile system, and a facsimile signal received following the call signal is automatically processed for the image recorder 14 to record an image represented by the facsimile signal if the facsimile system 10 receives the facsimile signal transmission signal CNG or facsimile signal processing signal ID which have been described above with respect to step W11 of FIG. 15. If none of these signals CNG and ID are received, the speaker 26 is activated to generate a ringing sound for a predetermined time. If the hand set 12 is picked up or the HOOK key 54 is pressed in response to the ringing sound, telephone communication with the calling party is made possible. If the hand set 12 is not picked up or the HOOK key 54 is not pressed, the speaker 26 is turned off, and an outgoing message stored in the audio DRAM 34 is transmitted to the remote telephone receiver, while an incoming message received from the remote telephone transmitter is stored in the audio DRAM 34.

The present facsimile system 10 is adapted such that in the facsimile/telephone reception mode (F/T mode) for selective facsimile and telephone communications, the pattern of the received call signal is detected or determined prior to the connection of the facsimile system 10 of the called party with the remote facsimile system as the calling party, and that unless any pattern designating signal in the form of the signal DTMF is received from the remote facsimile system, the ring pattern data are retrieved from the memory area of the ring pattern memory section 32b of the EEPROM 32 which corresponds to the detected pattern of the received call signal, so that the speaker 26 is activated to generate a ringing sound according to the retrieved ring pattern data. The present arrangement enables the users of the facsimile system 10 to recognize the telephone number being called by the received call signal, namely, permits the users to know who should respond to the ringing sound, the pattern of which corresponds to the telephone number being called. Thus, the present facsimile system 10 can fully utilize the distinctive ringing service (D/R service) even though the ringing sound is generated after the facsimile system 10 has been connected to the remote facsimile system through the telephone line, that is, even after the call signal from the telephone exchange company is cut off.

It is significant to note that the patterns of the ringing sound corresponding to the patterns of the received call signals may be different from the patterns of the call signals, since the patterns of the ringing sounds are determined and registered in the ring pattern memory section 32b of the EEPROM 32, by the users according to the routine of FIG. 10. In other words, the patterns of the call signals are not or need not be directly used to generate the ringing sound. If the call signal patterns indicated at (c) and (d) in FIG. 20, which are similar to each other, were used to generate the ringing sounds, it is rather difficult to distinguish these ringing sounds from each other. The present embodiment permits the users to use clearly distinct ringing sound patterns which correspond to those similar call signal patterns.

Further, the present facsimile system 10 permits the registration of ringing sound patterns other than those corresponding to the telephone numbers used for telephone communication. As indicated in FIG. 2, a total of five ringing sound patterns (for Messrs. A through E) are stored in the respective memory areas of the ring pattern memory section 32b of the EEPROM 32, while only two telephone numbers are used for telephone communication by Messrs. A and B. In this respect, it is noted that if a signal DTMF designating or selecting the ringing sound pattern other than those corresponding to the telephone numbers is received from the remote facsimile system after the facsimile system 10 is connected to the remote facsimile system, the speaker 26 is activated to generate a ringing sound of the pattern designated by the received signal DTMF. This arrangement is convenient where the number of the users of the facsimile system 10 is larger than the number of the telephone numbers used. The present arrangement permits effective use of one single telephone for two or more users, and enables such users to know who is the recipient of a telephone call or facsimile transmission, depending upon the pattern of the ringing sound generated according to the signal DTMF.

The present facsimile system 10 is also characterized by the use of the phone call reservation signal which is received from the remote facsimile system to designate the ringing sound pattern stored in the memory area of the ring pattern memory section 32b corresponding to the registration number [9]. The phone call reservation signal is generated by pressing the CALL RESERVATION key 62 on the panel 40 at the remote calling party, when the calling party wants to speak with the called party by telephone. Since the pattern of the ringing sound generated upon reception of the phone call reservation signal is different from the ringing sound patterns corresponding to the telephone numbers or pattern designating signal DTMF, the called party easily understands that the calling party wants to speak with the called party.

It will be understood from the foregoing description of the present embodiment that portions of the CPU 24, RAM 28 AND ROM 30 assigned to implement steps W1 and W2 (sub-routine of FIG. 16) constitute pattern detecting means for detecting the pattern of each call signal received from the remote calling party before the telephone set is connected to the remote calling party. It is also noted that portions of the CPU 24, RAM 28 and ROM 30 assigned to implement steps W4, W7, W9 and W10 cooperate with the speaker 26 to constitute first sound generating means, operable after the telephone set is connected to the calling party, for generating calling sounds having respective different patterns, depending upon the patterns of the received call signals as detected by the pattern detecting means. The memory area corresponding to the registration numbers [1] and [2] of the ring pattern memory section 32b of the EEPROM 32 constitute a first pattern data memory for storing first pattern data sets representative of different patterns of the calling sounds in the form of the ringing sounds. Further, the memory areas corresponding to the registration numbers [4] through [8] of the ring pattern memory section 32b of the EEPROM 32 constitute a second pattern data memory for storing second pattern data sets representative of respective patterns of calling sounds (ringing sounds) which correspond to respective pattern designating signals (signal DTMF) received from the remote calling party. The memory area corresponding to the registration number [9] of the ring pattern memory section 32b constitutes a third pattern data memory for storing a third pattern data set representative of the pattern of a special calling sound which is generated upon reception of the phone call reservation signal received from the calling party. In this respect, it is noted that the CALL RESERVATION key 62 functions as an operator-controlled key for generating the phone call reservation signal. It is further noted that portions of the CPU 24, RAM 28 and ROM 30 assigned to implement steps R4, R5, W18 and W19 cooperate with the speaker 26 to constitute second sound generating means, responsive to the phone call reservation signal received after the telephone set is connected to the calling party, for retrieving the third pattern data set from the third pattern data memory, and generating the special calling sound according to the retrieved third pattern data set.

Further, the FUNCTION key 44 and the SELECTOR keys 46 constitute operator-controlled means for establishing a registering mode in the form of the D/R SET mode in which the pattern data representative of the patterns of the call signals are stored in the pattern data memory. Portions of the CPU 24, RAM 28 and ROM 30 assigned to execute the routine of FIG. 10 constitute pattern registering means operable in the registering mode for storing the different patterns of the calling sounds in the first pattern data memory as the pattern data. Further, portions of the CPU 24, RAM 28 and ROM 30 assigned to implement step W4 of the sub-routine of FIGS. 14–15 constitute pattern selecting means for selecting one of the different patterns of the calling sounds which corresponds to the pattern of each received call signal as detected by the pattern detecting means.

It is further noted that the speaker 26 functions as ringing means for generating the ringing sounds as the calling sounds. It is also noted that the audio DRAM 34 functions as a message data memory for storing message data representative of at least one prompting message which prompts the remote calling party to transmit one of the pattern designating signals in the form of the signal DTMF to the facsimile system 10 as the called party. Portions of the CPU 24, RAM 28 and ROM 30 assigned to implement step W6 of the sub-routine of FIGS. 14–15 constitute message generating means operable after the telephone set is connected to the remote calling party, for transmitting the prompting message to the calling party. It is further noted that the call pattern memory section 32a of the EEPROM 32 functions as a call pattern data memory for storing call pattern data representative of the patterns of the call signals.

In the present embodiment, the patterns of the call signals assigned to call the facsimile reception telephone number and the telephone numbers used for telephone communication are automatically registered in the respective memory areas of the call pattern memory section 32a of the EEPROM 32, according to the routine of FIGS. 6–7, while those call signals are actually received (from a telephone exchange company) in response to telephone or facsimile calls from remote calling party or parties, when the facsimile system 10 is placed in the D/R SET mode, which can be easily established by using the FUNCTION key 46 and the SELECTOR keys 46. This arrangement assures easy and accurate registration of the ON-OFF patterns of the individual call signals assigned to call the telephone numbers used.

In the embodiment which has been described, the ringing sound patterns stored in the ring pattern memory section 32b of the EEPROM 32 are selectively used by the speaker 26 to generate the ringing sounds, depending upon the pattern of the received call signal and the received pattern designating DTMF signal. However, the generation of the ringing sound according to the received signal DTMF may be eliminated, as in a second embodiment illustrated in the flow chart of FIG. 17, by way of example. In the embodiment of FIG. 17, steps W2 and W3 are adapted to simply determine whether the received call signal has the facsimile reception pattern, and if a negative decision (NO) is obtained in step W3, the control goes to step W21 to store in the RAM 28 the ON-OFF pattern of the received call signal. Step W21 is followed by step W5 in which the facsimile system 10 is connected to the remote facsimile system, and then by step W10 in which the speaker 26 is activated to generate a ringing sound according to the ON-OFF pattern stored in the RAM 28. In this second embodiment, portions of the CPU 24, RAM 28 and ROM 30 assigned to implement steps W21 and W10 cooperate with the speaker 26 to constitute the first sound generating means.

In the first and second embodiments, only one prompting message is stored in the outgoing message area of the audio DRAM 34, and is transmitted to the remote calling party, irrespective of the pattern of the call signal received from the calling party. However, two or more different prompting messages may be used. For example, where the call pattern memory section 32a has three memory areas available for storing the call signal patterns for three different telephone numbers as in the embodiment of FIG. 2, the audio DRAM 34 may be adapted to store three different prompting messages corresponding to registration numbers [1], [2] and [3] as indicated in FIG. 18, which correspond to the three telephone numbers. In this case, step W6 of the F/T reception processing sub-routine of FIGS. 14 and 15 is formulated so that one of the three prompting messages is retrieved from the audio DRAM 34, depending upon the pattern of the call signal determined in step W2, to transmit the retrieved prompting message to the remote calling party. For instance, the EEPROM 32 may store call pattern data and ring pattern data as indicated in FIG. 19. In this example, the telephone number [2222] is used by a user group A while the telephone number [3333] is used by user group B, and the call signal patterns calling these telephone numbers [2222] and [3333] are stored in the memory areas of the registration numbers [1] and [2] of the call pattern memory section 32a, respectively, as in the above embodiment. Further, the ringing sound patterns corresponding to the user groups A and B are stored in the memory areas of the registration numbers [1] and [2] of the ring pattern memory section 32b, respectively. Further, the facsimile system 10 according to this third embodiment is adapted such that Messrs. K, L and M use the telephone number for the user group A, while Messrs. O and P use the telephone number for the user group B, and such that the ringing sound patterns for calling Messrs. K, L, M, O and P are stored in the memory areas of the registration numbers {4} through [8] of the ring pattern memory section 32b, respectively, as indicated in FIG. 19. In this case, a prompting message for Messrs. K, L and M is stored in the memory area of the registration number [1] of the audio DRAM 34 while a prompting message for Messrs. O and P is stored in the memory area of the registration number [2] of the audio DRAM 34, as indicated in FIG. 18.

The prompting message for Messrs. K, L and M may be a message "Please press the numeral keys "4", "5" and "6" to speak with Mr. K, Mr. L and Mr. M, respectively.", while the prompting message for Messrs. O and P may be a message "Please press the numeral keys "7" and "8" to speak with Mr. O and Mr. P, respectively.". If the received call signal calls the telephone number [2222] for the user group A, the prompting message stored in the memory area of the registration number [1] of the audio DRAM 34 is transmitted to the remote facsimile system in step W6. If the received call signal calls the telephone number [3333] for the user group B, the prompting message stored in the memory area of the registration number [2] of the audio DRAM 34 is transmitted in step W6. The prompting messages may be stored in the respective memory areas of the audio DRAM 34 which are designated by the respective numeral keys of the FUNCTION/NUMERAL keys 42, as in the registration of the call signal patterns according to the routine of FIG. 9 or ringing sound patterns according to the routine of FIG. 10.

While the present invention has been described in detail in its presently preferred embodiments, it is to be understood that the invention may be otherwise embodied.

In the illustrated embodiments, the prompting messages are transmitted to the remote facsimile system in step W6 after the connection of the facsimile system 10 to the remote facsimile system, to prompt the calling party to press the appropriate key for transmitting the corresponding pattern designating DTMF signal which designates the person at the called party with whom the calling party wants to speak. However, the transmission of the prompting messages to the remote calling party may be eliminated if the calling party has been informed of the relationship between the numeral keys of the FUNCTION/NUMERAL keys 42 and the persons with whom the calling party wants to speak.

In the illustrated embodiments, only the F/T reception mode is formulated such that the pattern of the received call signal CI is determined in step W4 before the connection of the facsimile system 10 to the remote facsimile system, and the ringing sound is generated according to the pattern corresponding to the determined call signal pattern after the connection of the facsimile system 10 to the remote facsimile system. However, the MANUAL reception mode and the TAD reception mode may be similarly formulated. In the MANUAL reception mode, the ringing sound may be generated before the facsimile system 10 is connected to the remote calling party.

Although the ringing sounds are generated according to the patterns stored in the EEPROM 32, the ringing sounds may be replaced by call messages generated according to call message data which are stored in the audio DRAM 34, in relation to the telephone numbers or called persons designated by the received signal DTMF. For example, a call message "Mr. A, you have a phone call." is stored in the appropriate memory area of the audio DRAM 34 which corresponds to the telephone number used for Mr. A. Such call messages may be considered as vocal sounds of different types. Thus, the ringing sounds and the call messages are both interpreted to mean calling sounds which call respective persons or indicate the reception of respective call signals calling respective telephone numbers.

In the F/T reception mode in the illustrated embodiments, step W11 is implemented to detect the reception of the signal CNG or ID after the speaker 26 is turned on in step W10, that is, while the ringing sound is being generated. However, step W11 may be implemented before step W10, namely, before the speaker 26 is turned on to generate the ringing sound for a predetermined time or a predetermined number of times. Other modifications of the sub-routine of FIGS. 14–15 may be made as needed.

Although the illustrated embodiment takes the form of a facsimile system having a facsimile transmitter and a facsimile receiver as well as the telephone hand set 12, the principle of the present invention is equally applicable to a telephone set of distinctive ringing type without facsimile transmitter and receiver.

While the FUNCTION key 44 and the SELECTOR keys 46 are used to establish the D/R SET mode, RING PATTERN SET mode and CALL MESSAGE SET mode, a single key may be used to establish these modes, like the MODE key 48 is used to select one of the reception modes (AUTO, F/T, MANUAL and TAD).

Although the desired patterns of the ringing sounds are registered in the EEPROM 32 by the users, appropriate ringing sound patterns are registered by the manufacturer of the facsimile system 10 so that the users may select the desired patterns from the registered patterns.

In the illustrated embodiments, the call pattern memory section 32a of the EEPROM 32 is capable of storing three call signals patterns other than the facsimile reception pattern, and the ring pattern memory section 32b is capable of storing eight ringing sound patterns other than the pattern used upon reception of the the phone call reservation signal. However, the numbers of the call signal patterns and ringing sound patterns that can be stored in the EEPROM 32 can be suitably changed. For instance, the memory sections 32a, 32b have ten or more memory areas for the call signal patterns and ringing sound patterns, which memory areas are identified by two-digit registration numbers. The memory sections 32a, 32b may be separate memories. A memory medium other than an electrically erasable programmable read-only memory (EEPROM) may be used for storing the call signal patterns and ringing sound patterns.

While the illustrated embodiments are adapted to store or register the call signal patterns according to the routine of FIGS. 6 and 7 in which the call signals are actually received and detected, the registration of the call signal patterns in the EEPROM 32 may be effected otherwise. For instance, potentially used call signal patterns as indicated in FIG. 20 are first stored in suitable memory means, and the user listen to the ringing sounds generated according to the patterns of the call signals which are actually received from a remote facsimile system, for the purpose of registering the pattern of each call signal assigned to call the telephone numbers used. The user listening to the ringing sound of each received call signal selects one of the ringing sound patterns stored in the memory means, and register the selected pattern in another memory means such as the EEPROM 32.

In the illustrated embodiments, the ON and OFF times of the call signal are measured to register the pattern of the signal by using the counters C(ON) and C(OFF). However, the ON and OFF times may be measured by using the clock pulses generated by the clock generator 38.

In the routine of FIGS. 6 and 7, the pattern of the call signal stored in the RAM 28 is registered in the call pattern memory section 32a of the EEPROM 32 (step S14) immediately after the appropriate numeral key of the FUNCTION/NUMERAL keys 46 is pressed (step S14-1). If any pattern has already been stored in the call pattern memory section 32a, the new pattern stored in the RAM 28 is substituted for the pattern already stored in the EEPROM 32. However, steps S14-4 and S14-5 may be preceded by a step to ask the user as to whether the already stored pattern should be replaced by the new pattern, or a step to inform the user by an alarm sound or voice message that a call signal pattern is already stored in the call pattern memory section 32a, and a step in which the START key 56 or other key is pressed to replace the old pattern by the new pattern. Similar modifications are possible with respect to the registration of the ringing sound patterns in the ring pattern memory section 32b of the EEPROM 32 according to the routine of FIG. 10.

It is to be understood that the present invention may be embodied with various other changes, modifications and improvements, which may occur to those skilled in the art without departing from the spirit and scope of the invention defined in the following claims.

What is claimed is:

1. A telephone set of distinctive ringing type of a called party capable of generating calling sounds corresponding to respective call signals which have respective different patterns calling respective telephone numbers of said telephone set and which are received from a telephone exchange through a telephone line, said telephone set comprising:

a call signal pattern data memory for storing data representative of different patterns of said call signals;

pattern detecting means for detecting the pattern of call signals received from said telephone exchange before the telephone set is connected through said telephone line to a remote calling party, said pattern detecting means determining the pattern of said received call signals by comparing the pattern of said received call signals with the different patterns of said call signals stored in said call signal pattern data memory;

a first sound pattern data memory for storing first pattern data sets representative of different patterns of said calling sounds which correspond to said different patterns of said respective call signals; and first sound generating means, operable after the telephone set is connected to said remote calling party, for generating the calling sounds according to one of said first pattern data sets which corresponds to the pattern of said received call signals determined by said pattern detecting means.

2. A telephone set according to claim 1, further comprising:

manually operated means for establishing a registering mode in which said first pattern data sets are stored in said first sound pattern data memory;

pattern registering means, operable in said registering mode, for storing different patterns of said calling sounds in said first sound pattern data memory, as said first pattern data sets; and pattern selecting means, operable when the telephone set is not placed in said registering mode, for selecting one of said different patterns of said calling sounds which corresponds to the pattern of received call signals as determined by said pattern detecting means, and wherein said first sound generating means generates the calling sound according to the pattern selected by said pattern selecting means.

3. A telephone set according to claim 1, wherein said first sound generating means comprises ringing means for generating ringing sounds having respective different patterns, as said calling sounds.

4. A telephone set according to claim 1, further comprising a second sound pattern data memory for storing second pattern data sets representative of respective patterns of calling sounds which correspond to respective pattern designating signals received from said remote calling party after the telephone set is connected to said remote calling party, and wherein when a pattern designating signal is received by said telephone set, said first sound generating means retrieves from said second sound pattern data memory one of said second pattern data sets which represents one of said patterns of calling sounds which corresponds to the pattern designating signal which has been received from said remote calling party after the telephone set is connected to said remote calling party, said first sound generating means generating calling sounds according to the pattern represented by the second pattern data set retrieved from said second sound pattern data memory, in place of the pattern represented by the first pattern data set, which corresponds to the pattern of the received call signals determined by said pattern detecting means.

5. A telephone set according to claim 4, wherein said first sound generating means comprises ringing means for generating ringing sounds having respective different patterns, as said calling sounds.

6. A telephone set according to claim 4, wherein said pattern designating signals are generated by operation of respective manually operated keys at said remote calling party.

7. A telephone set according to claim 4, further comprising:

a message data memory for storing message data representative of at least one prompting message which prompts said remote calling party to generate one of said pattern designating signals; and message generating means, operable after the telephone set is connected to said remote calling party, for transmitting a selected one of said at least one prompting message to said remote calling party, and wherein said first sound generating means comprises pattern selecting means for selecting one of said second pattern data sets stored in said second pattern data memory, depending upon said one of said pattern designating signals which is generated from said remote calling party in response to said selected one prompting message.

8. A telephone set according to claim 1, further comprising:

a third sound pattern data memory for storing a third pattern data set representative of a pattern of a special calling sound which is generated upon reception of a phone call reservation signal received from said remote calling party requesting the called party to call the remote calling party, after the telephone set is connected to said remote calling party; and second sound generating means, responsive to said phone call reservation signal received after the telephone set is connected to said remote calling party, for retrieving said third pattern data set from said third sound pattern data memory, and generating said special calling sound according to said retrieved third pattern data set.

9. A telephone set according to claim 8, wherein said phone call reservation signal is generated by operation of a manually operated key provided at said remote calling party, said manually operated key being operated when said remote calling party wants to speak with said called party.

10. A telephone set of distinctive ringing type of a called party capable of generating calling sounds corresponding to call signals which have respective different patterns calling respective telephone numbers of said telephone set and which are received from a telephone exchange through a telephone line, said telephone set comprising:

a call signal pattern data memory for storing call signal pattern data sets representative of said different patterns of said call signals, respectively;

pattern detecting means for detecting the pattern of said call signals received from said telephone exchange before the telephone set is connected through said telephone line to a remote calling party, said pattern detecting means determining the pattern of said received call signals by comparing the pattern of said received call signals with different patterns represented by said call signal pattern data sets stored in said call signal pattern data memory;

a first sound pattern data memory for storing first pattern data sets representative of different patterns of said calling sounds which correspond to said different patterns of said respective call signals;

a second sound pattern data memory for storing second pattern data sets representative of respective patterns of calling sounds which correspond to respective pattern designating signals received from said remote calling party after the telephone set is connected to said remote calling party; and sound generating means, operable after the telephone set is connected to said remote calling party, for generating the calling sounds, wherein the sound generating means generates calling sounds according to one of said first pattern data sets which corresponds to the pattern of said received call signals, as determined by said pattern detecting means, when no pattern designating signal is received by the telephone set after the telephone set has been connected to the remote calling party, and wherein if one of said pattern designating signals is received from said remote calling party, said sound generating means retrieves, from said second sound pattern data memory, one of said second pattern data sets which represents one of said patterns of calling sounds which corresponds to the pattern designating signal which has been received from said remote calling party after the telephone set is connected to said remote calling party, said first sound generating means generating calling sounds according to the pattern represented by the second pattern data set retrieved from said second sound pattern data memory, in place of the pattern represented by the first pattern data set which corresponds to the pattern of the received call signals, as determined by said pattern detecting means.

* * * * *